United States Patent [19]

Vella et al.

[11] 4,345,245

[45] Aug. 17, 1982

[54] METHOD AND APPARATUS FOR ARRANGING SEGMENTED CHARACTER GROUPS IN A DIGITAL TYPESETTER

[75] Inventors: Louis C. Vella, Selden; Walter I. Hansen, Cold Spring Harbor, both of N.Y.

[73] Assignee: Eltra Corporation, Morristown, N.J.

[21] Appl. No.: 97,276

[22] Filed: Nov. 26, 1979

[51] Int. Cl.³ .................... G06F 3/14

[52] U.S. Cl. .................... 340/744; 340/724; 340/748; 340/750; 340/799; 340/146.3 AH; 364/900

[58] Field of Search .............. 340/331, 744, 748, 749, 340/750, 724, 146.3 AH, 723, 731, 799; 364/523, 200 MS File, 900 MS File

[56] References Cited

U.S. PATENT DOCUMENTS

| | | | |
|---|---|---|---|
| 3,783,331 | 1/1974 | Darnall | 340/744 |
| 3,806,871 | 4/1974 | Shepard | 340/146.3 H |
| 4,026,555 | 5/1977 | Kirschner et al. | 364/200 |
| 4,078,249 | 3/1978 | Lelke et al. | 340/731 |
| 4,079,458 | 3/1978 | Rider et al. | 340/750 |
| 4,107,786 | 8/1978 | Masaki et al. | 178/30 |
| 4,168,489 | 9/1979 | Ervin | 340/146.3 MA |
| 4,203,102 | 5/1980 | Hydes | 340/750 |
| 4,241,340 | 12/1980 | Raney, Jr. | 340/731 |
| 4,254,409 | 3/1981 | Busby | 340/723 |

*Primary Examiner*—Gareth D. Shaw
*Assistant Examiner*—Eddie P. Chan
*Attorney, Agent, or Firm*—Joel I. Rosenblatt

[57] ABSTRACT

A method for displaying characters on a raster display including the steps of storing a digitized font of normalized encoded characters in a first store, storing the identity size, and display location of the characters in a second store, generating a succession of raster lines, 1 through N, said first raster line being 1 and said last raster line being N in a predetermined order of raster lines, arranging successive characters in said second store into segments, each segment referenced to a respective raster line 1 through N, reordering the sequence of said segments by the value of each segment's respective raster line 1 through N, sequentially identifying respective segments for successively generated raster lines, identifying the boundaries of the characters within the said segments intersecting the raster lines and displaying the said characters responsive to said identified intersections.

23 Claims, 23 Drawing Figures

CHARACTER DATA SCALING

DATA MANAGEMENT SUBSYSTEM

OUTLINE CONVERTER SUBSYSTEM

FIG. 10 OUTLINE DATA WORDS

OUTLINE DATA FILE
DISK STRUCTURE

HEADER AND OUTLINE DATA STRUCTURE

DATA RAM DOUBLE BUFFERING DESIGN

DATA MANAGEMENT
RAM BUILDING FLOW

DATA RAM LAYOUT

METHOD AND APPARATUS FOR ARRANGING SEGMENTED CHARACTER GROUPS IN A DIGITAL TYPESETTER

CROSS-REFERENCE TO RELATED APPLICATIONS

The subject matter of this application is related to that of Commonly-owned U.S. Pat. No. 4,231,096, entitled "DIGITAL TYPESETTER".

FIELD OF THE INVENTION

The present invention relates to digital typesetters for imaging graphics quality characters on a raster scan from a specified font stored in digital form.

BACKGROUND OF THE INVENTION

Digital typesetters image typographical or typeface characters coded in digital form and stored on a digital storage medium such as a magnetic tape drum or rigid or floppy disc. Such digital typesetters are normally provided with a cathode ray tube (CRT) or laser beam imaging system for writing the characters onto a light sensitive film or paper.

Such a device is shown in copending U.S. Pat. No. 4,231,096, and assigned to the common assignee. As shown in that application, a digital typesetter has an imaging system producing a one dimensional raster line across the width of the print media. This raster line is repeated down the length of the print medium to form a raster scanning system.

A digitized master font contains digitally encoded normalized characters which may be expanded or reduced in size through digital techniques, before the data is transmitted to an imaging system to form characters.

The system described in the copending application receives first digital data defining the identity, form, size and placement of the characters to be typeset. The first data is set into the system in a sequence by the typesetting composer.

The system then receives second digital data defining the contour of each character to be typeset with respect to the normalized encoded set of data.

The system then produces third digital data defining the locations of the characters boundaries intersecting each of a series of raster scan lines.

The characters are formed by modulating a light beam at the character boundary raster intersections and each of the characters are formed over a succession of raster lines.

A plurality of characters may intersect a single raster line, extending across the width of a print medium. The system then identifies the intersections of each single raster line with the boundaries of these characters. It modulates the beam at the intersection points to image that portion of the character intersecting that single raster line. It then continues the process for the succession of raster lines.

A character imaging device such as a laser scanner is connected to a line storage buffer which stores the location data for the character intersections. This data is then provided to the imaging device to image the character on the succession of raster lines and on a print medium.

The first digital data defining the identity, form, size and placement of the characters to be typeset originates from a word processing system.

As is typical and well-known in such systems, an operator may sit at a keyboard, and by known techniques insert a text which is then stored on a storage medium, such as a floppy disc, and justified. The sequence of the text stored in data form usually is identical to the sequential input of the data by the composer.

As described in the cross-referenced applications, the second digital data for the fonts comprises a series of digital numbers defining the coordinates of the start points of character outlines and the length and direction of a plurality of straight line vectors extending successively along the character outlines from these start points. The second digital data is encoded on a normalized coordinate system. The length and direction of each vector is represented by first and second coordinate distances.

The data processing system additionally employs a memory for storing fourth digital data derived from the first and second digital data and used to generate the said third digital data.

The fourth digital data defining the character is arranged within an internal memory in sequentially addressable locations. The fourth digital data is then given to the output data system for conversion into character boundary information according to its sequential arrangement.

In composing text, the composer follows the typical convention of writing from left to right and from the top of the page to the bottom of the page.

Without other added steps, the data is then physically located in the storage medium in the same sequence as it was placed into the system. It follows this input sequence starting with the left upper corner of a text page, proceeding across the page in the width direction and then when a line is completed, proceeds down a line in the ascending order of the lines. The sequence then continues across the page width, and down another line increment in the same ascending order.

Ascending order as used here and in the description of the invention is a convention chosen to explain the invention and assumes the line value at the top of a page of text starts with 1 and the lines increase in value as lines are generated from the top to the bottom of the text page. However, as will be seen, the principles of the invention are the same regardless of the convention chosen.

When the data is to be imaged on a raster screen, and across a series of successive raster lines generated in ascending order along one dimension of the print medium, the data may be read out in the same sequence it is written into memory or in a FIFO sequence.

In this case, data to the left most position on the page for a line would be read out first and each successive character across the width dimension of the page can then be accessed to provide information to modulate the beam.

However, in composing characters, especially in typesetting, a succession of characters may be put on a line, with successive characters towards the right hand side of the page, in larger character size than those characters on the same line and towards the left side of the page. Additionally, characters of the same size may be placed on a higher base line relative to those characters closer to the left side of the page. Where these characters have raster lines in common, those characters placed towards the right side of the page will be located on raster lines having a lower ascending order then characters placed towards the left side of the page.

Where the character data is accessed, in the same sequence it was put into the system, those characters towards the right side of the page and imaged across raster lines with a lower ascending order would be imaged out of sequence with the order of the raster lines and the upper portion of these characters would not be imaged.

Where the character data is placed into the store in the exact text setting sequence, for example from left to right, then following that sequence, data for the left most characters would be provided first to the output system. This data would not be accessed until the raster line sequence had progressed in ascending order to a value corresponding to and beginning with the most left side character data. Where the data is retrieved from the system in the input sequence, the data for the characters on the right side of the page, having portions extending above the left side characters but intersecting common raster lines would be accessed later in time. That data would be provided to the output system on a real time basis after the raster lines corresponding to that data had been imaged.

On a real time basis, those characters to the right of the page would be accessed after the raster line sequence had proceeded past the point where portions of those characters were to be imaged. Those portions of those characters would be lost.

Where characters are all of the same size and located on a common base line, the size and placement of the characters may take any form.

However, in a system where the character contours are stored in a digital data base, and where that data base is used to compute character intersection points, the data representing those characters must be accessed and provided to the output system, in the sequence of raster lines. If the situation were otherwise, portions of characters would be lost as explained above, and the capability of such a system to display characters of random sizes and at random locations from a normalized encoded font would be lost.

SUMMARY OF THE INVENTION

This device provides a means and method for examining data corresponding to a text of composed characters and the sequential order in which data is initially assembled.

It then reorders that data sequence, in the order it must be provided to an output system, so that all data may be imaged on a succession of raster lines, generated in a predetermined order in which may be an ascending order. As the characters must be provided to the output system in the same sequence as the sequence of ascending raster lines, it is necessary for the system to reorder data where the initial input data sequence would cause a loss of some of the character information.

In typesetting systems, all characters are referenced to an EM square. The EM square is a reference size square for all characters of the same point size. As the point size changes, the size of the EM square changes respectively, the EM square becoming larger as the point size increases and the EM square becoming smaller as the point size decreases.

The EM square being common to all characters, is then a convenient way to reference the characters and their locations on the raster display.

However, it should be understood that other schemes could be used to reference the characters to a referenced raster line, such as by identifying the first raster line intersection at the top of each individual character or identifying a raster line referenced to any other common character parameter. However, such a scheme would be more involved than the scheme shown. This scheme relys on the fact that characters of the same point size are set within the same size EM square and then identifies a raster line common to a common EM square parameter for successive characters.

According to the principles of the invention, the upper level of the EM square and particularly a coincidence of an EM square data level with a raster line is used for referencing the character to a position on a raster display. All successive characters having the same point size and being located on the same base line will have their upper or top most data level, and the upper left hand EM square corner intersecting with a common raster line. The raster line level is then used as a reference to locate the character along one dimension of an imaging surface. The reference raster line is the lowest value line in an ascending raster line order that intersects an EM square located on the raster display. In a conventional scheme, raster lines are generated progressively along the length dimension and in ascending order. Ascending is a convention for assigning values to raster lines and is explained in the foregoing.

Referring back to the example above, all successive characters of a common point size and set on a common base line can be referenced to a common raster line location. That raster line is then a reference raster line for that succession of characters. The system identifies the ascending value of each raster line and its location in the said one dimension of the display and initializes the generation of character data to the imaging system when the raster line progression has reached the referenced raster line value and the location of the character EM square on the display.

One problem addressed by this invention, exists where two characters of different point sizes are located on the same base line and wherein the smaller size character is to the left of the larger size character.

When the text data was put into the system, according to a sequence, and the data processing system accesses the data in a sequence, the sequence of the above stated will occur somewhere in the text.

Where the left most character is smaller than a successively placed larger character, the output data system will then start the generation of the character output data for the left most character, the smaller character, and at a raster line level successive to a raster line intersection level for the larger character to the right.

Where the smaller character is an "A" and the larger characters is also an "A" set on the same base line and twice the size of the smaller character, the succession of raster lines will intersect the larger A at a lower raster line value and before successive raster lines of a higher value are produced to intersect the top of the smaller A.

If the text data is loaded in a sequence with the small A first and the second larger A in next, the output data system following this sequence will output intersection points for the small A first, after the preceding raster lines intersecting the top of the larger A were produced on a real time basis. It will then be incapable of outputting intersection data for the portion of the large A existing between the top of the small A and the top of the large A as those raster lines have already been imaged. As the raster lines are produced successively, the system cannot reverse the direction of the raster line progression. However, by segmenting and resequencing the text data after it is put into the data processing system and specifically resequencing relative to the sequential value of the raster lines, it is possible to generate the character intersection data in the proper order regardless of the order the text data is placed in the system.

According to the principles of this invention, this method recognizes and divides the small A and the larger A text data into two separate data segments even though they appear on the same base line. Then in reordering the data, the large A having a raster reference line of a lower ascending value is given a higher priority than the small A and is placed into the output data system first. The output data system then on a real time basis initiates the generation of raster intersection points for the character boundaries of the large A first and for the raster lines appearing earlier and higher on the page, with a lower ascending value than for the raster lines appearing earlier and lower in the page with a higher ascending value and intersecting with the smaller size A.

This concept is further extended with regard to base line changes, line rule functions, reverse video functions and sector overflows, requiring that data be segmented and reordered, so that it may be identified and acted upon in the sequence of the generated of raster lines.

The system recognizes the most efficient way of imaging on is to generate successive raster lines in one direction and in order and with all data imaged in the same ascending raster line order.

In this system segmenting is initiated after all the first input data representing the text has been placed into the first storage and the input data is hyphenated and justified according to known word processing techniques so the positions of each character on a page are identified.

The character positions may be established by a base line identification, and by the point size of the characters.

Other suitable character identifications may be for line rule functions, and reverse video functions.

A series of 8 bit codes is used to define the characters and their placement on the page.

For example, starting with the text on the left most side of the page, an 8 bit command would indicate the point size.

Upon change of point size on the same base line, a command such as "change point size" would be followed by the desired point size and so on.

Where a base line change occurs, then the base line change would be provided after a respective base line change command. Other change parameters would be similarly provided.

The segmentation scheme uses these commands to identify the start of each of the segments. Each may be identified by a command to indicate a character size change, base line change, a line rule function, a reverse video function, or a sector overflow.

As stated above, the text data is located in the first store in the order the text is placed in the system.

Segmenting provides a file arranged in the order in which the character data corresponding to the text is to be imaged and in an order related to the ascending order of the sequentially produced raster lines.

Segmenting starts by first examining the first store of text character data for an appropriate command indicating the start of a new segment.

Then the first character within that segment is referenced to a raster line appearing on the display.

All successive characters are then examined for identity in base line and point size and a segment is formed of these characters. The address of that segment is stored in a header file which includes the display location coordinates of the upper left hand corner of the EM square of the first character of each segment.

The convention of X and Y coordinate systems may be used as may any other coordinate system. The Y coordinate as may be used here corresponds to the locations of the successively produced raster line in one direction usually corresponding to the length of the display medium. The X coordinate similarly refers to the location of the first character of each segment in the second coordinate direction, usually the width dimension in a two coordinate system. As stated, any suitable coordinate system may be used consistent with the manner in which the raster lines and the direction in which the raster lines are produced.

A header file is built which contains an address listing for each identified segment of the text character data.

As the segments are identified by point size location, and the display in raster units is related to point size, by using a simple conversion the point size location may be used to correlate the EM square with a raster reference value in the raster resolution units.

As will be shown in the following, according to the convention used, the top of the display is the location of the first raster line. In this convention, the raster lines increase in value in ascending order towards the bottom of the display, and the last line of copy. Using this convention, and recognizing that other conventions can be chosen within the spirit of the invention, the segment positions are identified by relating the Y coordinate of the upper left hand corner of the first EM square of each segment to its location on the raster display and to a raster reference line.

According to the principles of the invention, line segments are identified by a raster reference line. As shown, the Y coordinate corresponding to the left hand upper corner of each segments first EM square is referenced to a raster line, passing through that coordinate. Each line segment has a value equal to the value of its referenced raster line. All line segments are arranged according to the value of their respective Y coordinate and location of the respective referenced raster line consistent with the ascending order of raster lines.

The line segments are reordered according to a set routine, one to another, so that an address file may be built starting with line segment address having the smallest Y value and reference raster line value line progressing with increasing Y values and reference raster line values to the line segment having the highest Y value and raster line value.

The complete header file may include the Y and X display coordinates of the left hand upper corner of each segment'a first EM square, the address of the line segment in the first store corresponding to the position placed during the input sequence, the font number, set width, track address and flash status, sector address slant byte track link and sector link.

A reordered address listing referring to the header file data in order of ascending Y values represents a changed order from the sequence of text data as first placed in the first store during the input sequence. The reordered segments can be read out in the reordered sequence merely by using the reordered address information. The segment data read out in this reordered sequence can then be loaded into a Data Ram in the output generating system in the order needed to image the characters in the successively generated raster lines.

As described in the aforesaid copending patent, the output data system receives segmented data for the identity, form, size and placement of characters to be typeset. The output data system then uses the character font data for the characters and the segment data to generate third digital data defining the character boundaries intersecting each progressively generated raster lines.

The segmenting scheme is shown for use in a typesetter employing the raster scan and imaging technique of the aforesaid patent application. However, the segmenting scheme and the principles of the segmenting scheme may be employed with any raster scanning system where the raster scan proceeds from one end of a display to the other end of the display in an ascending order and where the characters may appear on intersecting common raster lines with a smaller character set to the left relative to a larger character in the direction of an advancing individual raster line.

Where a raster line pattern is generated across a print medium or display, one end to the other and in one direction with the initial raster line being numbered one and the last raster line being numbered number n and with the raster lines increasing in number in an ascending order in a direction towards the end of the print medium and where each raster line is swept from one side of the page to the other side of the page, and wherein data for a smaller character is placed into the system before data for a character of a larger character, with a portion of the larger size character intersecting a common raster line with a smaller size character while also intersecting a lower value raster line than the said common raster lines, then the character data is reordered according to the referenced raster lines and in the ascending order of the raster lines.

As the raster lines are being layed on a display or print medium in a single direction, and on the real time basis, the generation of the character data must be of the same timing as the generation of the raster lines.

As stated before, the raster lines are generated from one end to another and in a single direction.

As shown above, the data representing the intersections of the characters with the raster lines must be generated in time with the progression of raster lines. This means that the intersection data must be generated in the same order and in time with the raster lines as they are layed on the print medium.

To obtain this result, the input data indicating the identify and location of the characters must be arranged in the same order as the progression of the reference raster lines. As described above, that order is an ascending order.

However, as discussed in the preceding, the convention by which the data is entered into the system may be different from the ascending order of the raster lines.

Where each character is referenced to a raster line, either by an EM square parameter or any other suitable characteristic, then the characters may be arranged in the raster line ascending order according to each character's reference raster line.

As shown above, under the standard writing convention, the characters are placed in the system from left to right and then down to the next line. In many cases as explained above, larger characters are set on the same line and to the right of the smaller characters. Interpreting this in terms of the raster display, the larger characters to the right will be on referenced raster lines having a lower ascending order then the smaller characters to the left. The order of the character data then must be reversed so that the data for the character to the right having a raster reference line intersection of lower ascending order is placed before the character data of the smaller character to the left having a higher value raster reference line.

This method is especially useful where normalized encoded contour character data is used to generate characters on a continuous raster display and on a real time basis. It reorders the character data information in such a manner that in all character data successively outputted is in step with the raster display and can be imaged on a print medium as the raster lines are generated progressively and without the need to reverse or change raster direction.

DESCRIPTION OF THE INVENTION

Figure 1:
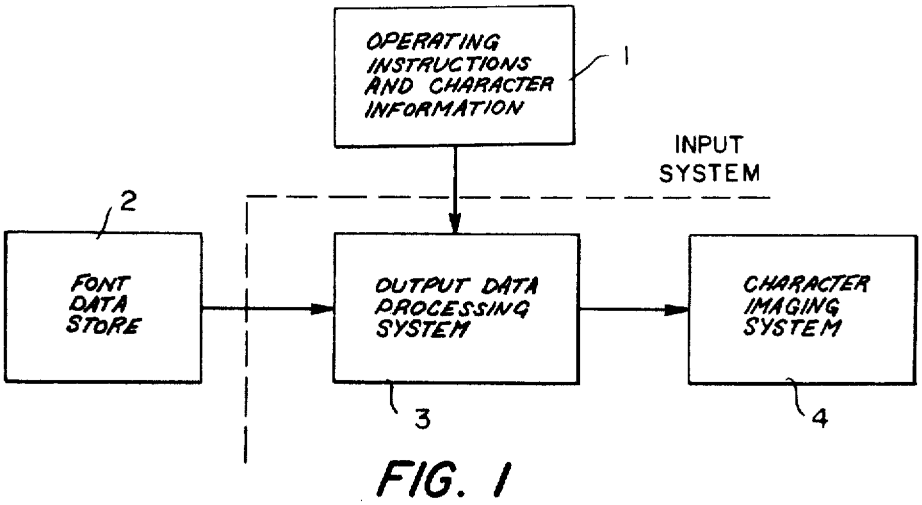
FIG. 1 is a block diagram of the overall typesetting system according to the present invention.

The character generating system utilizing the principles of the invention will now be described with reference to FIGS. 1-21 of the drawings. Identical elements shown in the various figures are labeled with the same reference numerals.

The overall system according to the present invention is shown, in block form, in FIG. 1. This general system is divided into an Operating Instructions and Character Information, Input System a Font Store 2 which supplies character information and font data, and an Output Data Processing System (ODS) 3 which drives a Character Imaging System 4. The details of the Output Data Processing system 3 as shown in FIGS. 7 through 16 and the appropriate programming instructions thereto are as shown in Appendix 1, U.S. Pat. No. 4,231,096 and in columns 27 line 45 through column 44 line 58. The Output Data System is also shown in column 9, line 45 through column 11 line 38 and the Font Data description and the Page Data description and the Input System Interface specification are shown in column 11, line 40 through column 27, line 45 of the above stated U.S. Pat. No. 4,231,096.

The Input device may be a paper tape or magnetic tape reader, a separate computer, an input terminal with a keyboard and CRT screen, or a data transmission channel such as a telephone line. This input device 1 supplies to the processing system 3 digital data defining the identity, form, size and placement of characters to be typeset. As used herein, the term "identity" of characters is intended to mean the name of each particular character shown, such as upper case "A", lower case "a", upper case "B", numeral "5"; semi-colon ";" and the like. This identity is given by a code. As used herein, the term "form" is intended to designate the shape of each character; i.e., the particular font and the amount and direction of slant. The term "size", as used herein, is intended to designate the size in both the X direction, ("set width") and in the Y direction ("point size") of each character. Finally, the term "placement", as used herein, is intended to mean the coordinate (X,Y) position of the character on the page to be typeset. The imaging system, 4 may be any suitable system for raster imaging of digital data as shown in copending application.

Figure 2:
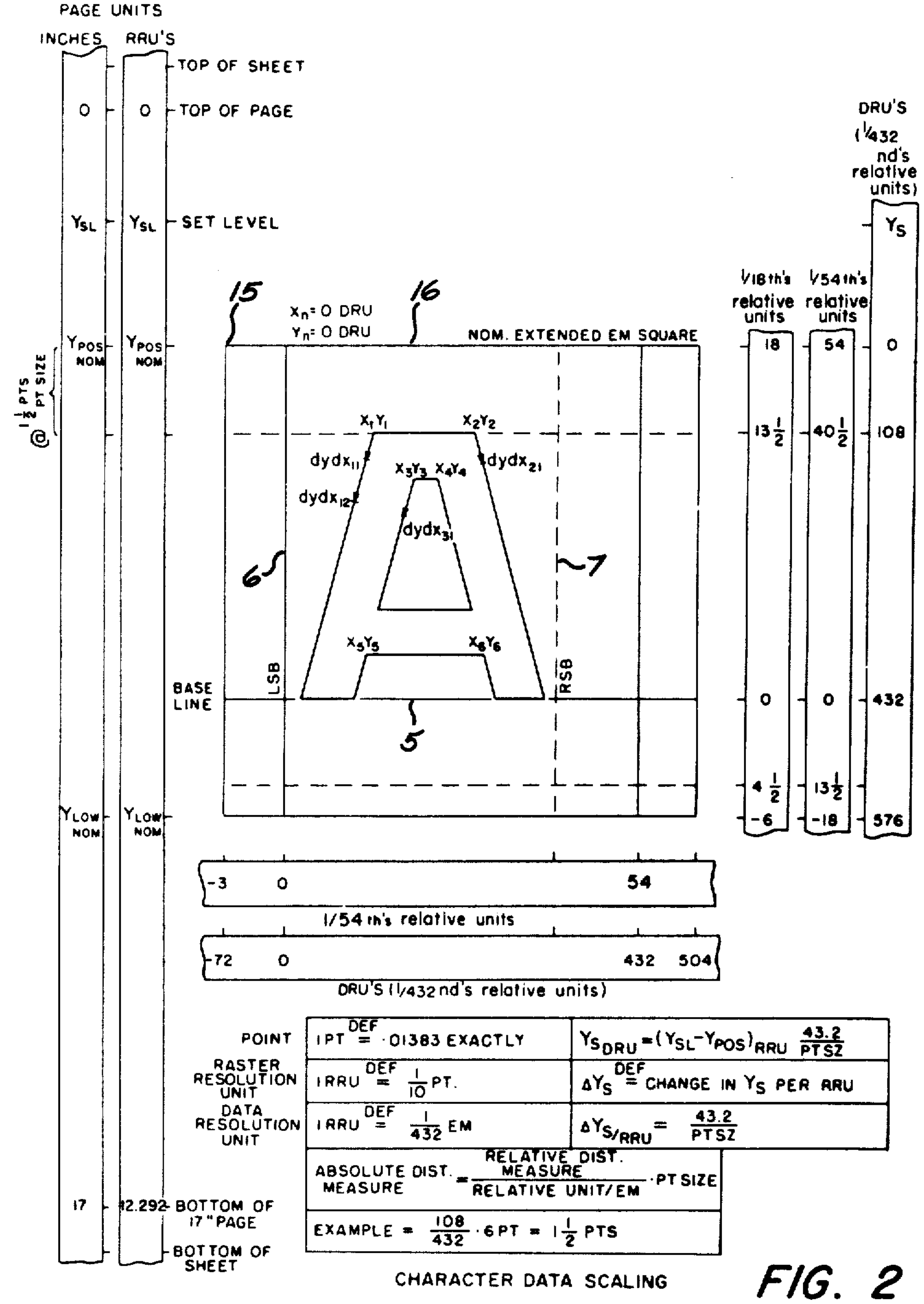
FIG. 2 is a diagram showing how the character data is encoded in the Font File.

In this particular embodiment, the input device designates the X position and Y position display position of the upper left corner of the "EM" square of at least a first character. The EM square is as shown in FIG. 2 and is the conventional manner of describing typeface and size. However, it should be understood that the size of the character may be established and designated by any other convention. In this case, by referencing all characters of the same size to a common EM square parameter, the ordering of the various segments is made more efficient with respect to the time utilization of the system components.

As shown in FIG. 2, the EM square contains a base line, 5 a left side bearing 6 (LSB) and a right side bearing 7 (RSB). The EM square in FIG. 2 is shown as a normalized extended EM square, the extended portion being that section on the bottom between 432 and 576 DRUS (data resolution units) to accommodate letters having portions normally extended below the base line such as J's and g's. In most cases, the letters, will be positioned between the base line 5 and a level below the top level 16 of the EM square as shown. In a few cases, the characters will extend substantially close to the top level 16 of the EM square. For reference purposes, the top level of the EM square is at the 0 DRU level.

The upper left hand upper corner of the EM square is used to locate the character on the display. As explained in the following, the EM square and character location is referenced to the raster line intersecting the EM square top level 16 and passing through its upper left hand corner at the top of the EM square. As shown in FIG. 2, the upper left hand corner is shown as numeral 15. The EM square is assigned a value indicative of the raster line level intersecting the top level 16 of the EM square. However, the principles of this invention should not be thought of as limited by the convention chosen to reference the characters to a location on a display and to a raster line level. Within the system, the EM square is divided into 432 DRU's (576 for an extended EM square) and may be further divided in to 18ths and 54ths. Within the system, 1/10 point is equal to one raster unit. The raster unit corresponds to the displacement between raster units on the display. The method of coding the characters and the arrangement of the character within the EM square is explained further in the description of this invention.

Figure 3:
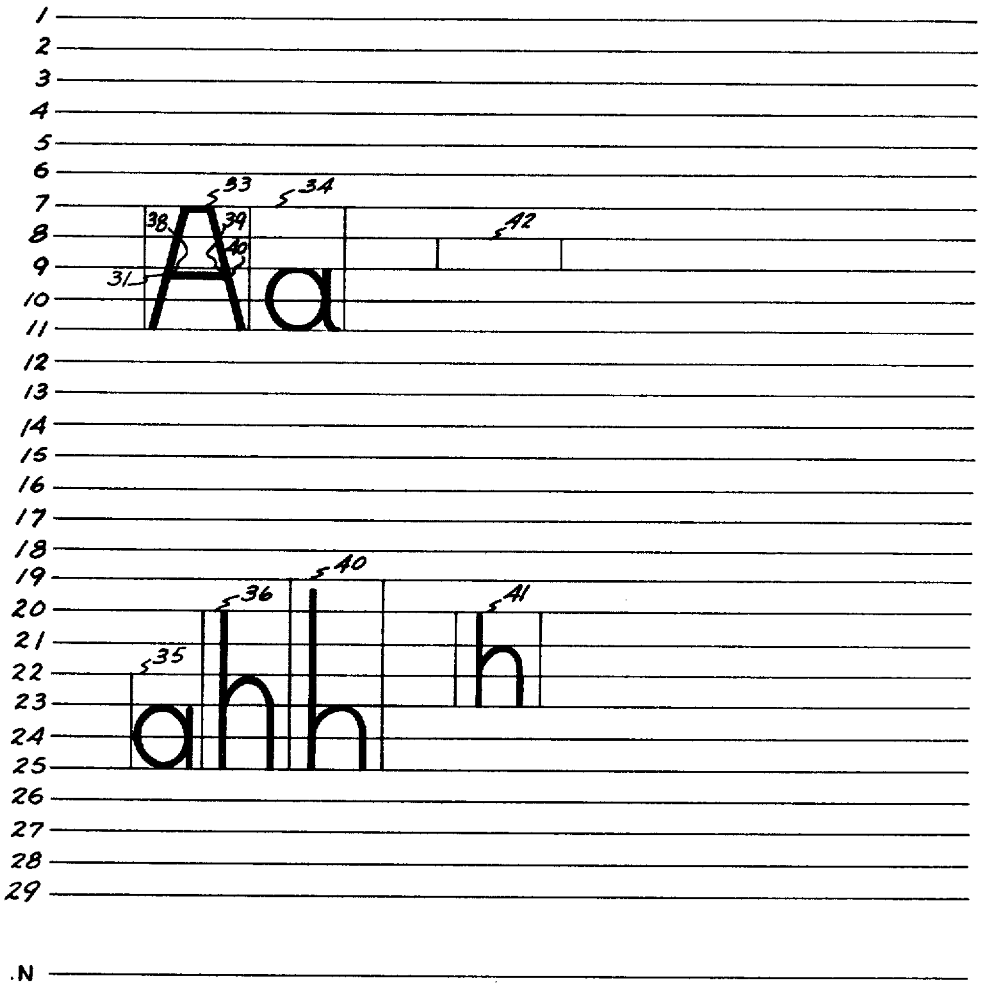
FIG. 3 is an arrangement of characters on a raster line display according to the input sequence.

Referring to FIG. 3, the manner in which the characters are arranged on the display is shown. A series of raster lines 1 through n are produced across the display starting with raster line 1 and ending with raster line n. The raster lines are generated in an ascending order and each individual raster line is generated from left to right. Ascending order is a convention chosen to assign values to the raster lines starting with 1 for the first raster line and assigning successively increasing values to each successively generated raster line in the direction the raster lines are produced. It should be understood, however, that the principles of the invention remain the same regardless of the convention use for generating the raster lines. As stated before, all characters are formed in an EM square with the same character size being formed in the same size EM square. A succession of characters having the same typesize and the same EM square size are shown imaged on raster lines 7 through 11. These are EM squares 33 and 34 containing the capital A and the small a respectively.

Some further examples of the manner in which characters can be set on the raster display for subsequent imaging on a print medium is shown with regard to EM squares 35, 36, 40 and 41.

EM square 35 is the same size as EM squares 33 and 34 and is set between raster lines 22 and 25. A small h is shown as a larger typesize set in an EM square 36 extending between raster lines 20 and 25", and to the right of EM square 35. Immediately to the right of EM square 36 is EM square 40 containing a small h and extending between scan lines 19 through 25. The next character to the right is a small h in EM square 41 and extending between lines 20 and 23. EM square 41 is the same size as EM square 35 but set on a higher base line, with a lower ascending value 23 as compared to baseline 25 for EM square 35.

A line rule function designated by numeral 42 is shown between raster lines 8 and 9.

Figure 4:
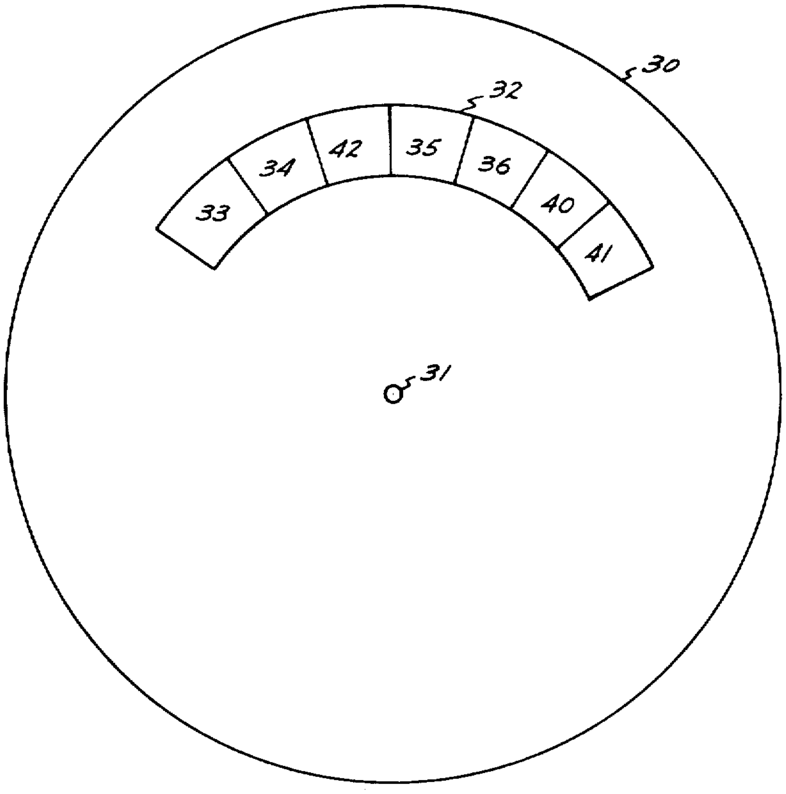
FIG. 4 is an arrangement of the data of FIG. 3 on a disk file.
Figure 5:
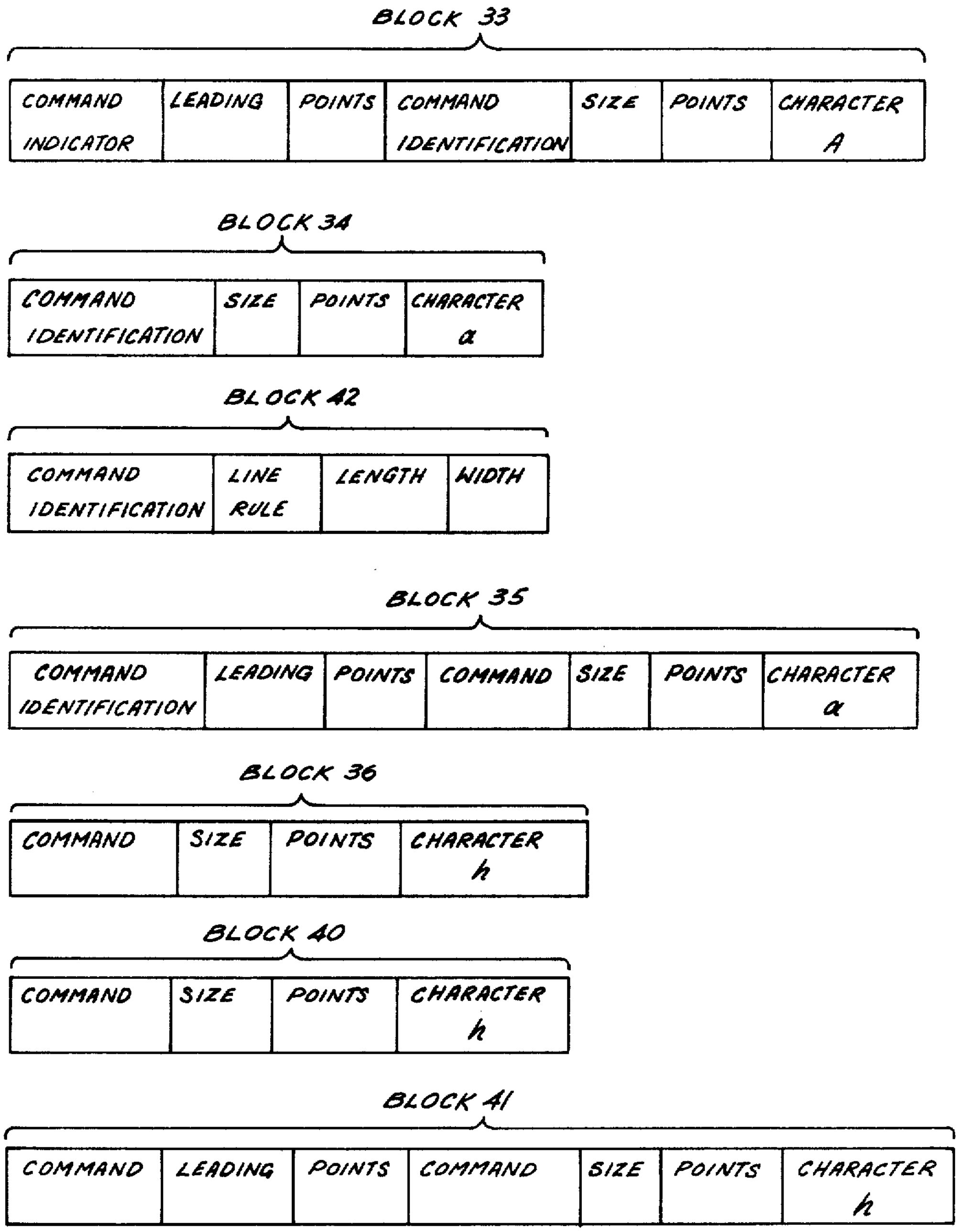
FIG. 5 is a block diagram of the data in FIG. 4.

The manner in which the input instructions are placed into the input system, for character size, location, and font, is shown in FIGS. 4 and 5.

The medium used to store this information is shown as a floppy disc 30, rotating about an axis 31. A sector 32 is shown on the disc 30, containing the data in blocks for EM square 33, EM square 34, line rule functions 42, EM square 35, EM square 36, EM square 40, and EM square 41.

For the purpose of explanation, the data for each line segment whether comprising one or a plurality of EM squares is shown as a block of data referenced by the same numerals as the respective first EM square of each line segment and including command data in addition to character data.

The physical location of the data is shown in the sequence in which it would most normally be placed on the disk by a composer. As conventional, the composer would work from left to right and then down the page to the next baseline the end of the right most character. In this case, the composer would insert the larger A of EM square 33 followed by the small a of EM square 34 followed by the line rule function 42. The composer would then proceed down the page to EM square 35 adding that data, followed by the data of EM square 36, EM square 40, and EM square 41.

The particular data within each of the blocks on the disk 30, for each of the characters is shown in FIG. 5.

The arrangement of data on disk 30 is shown for explaining the invention, it being understood that the data could be randomly distributed and addressed in the input sequence of "33-41" shown in FIG. 4, or in any other chosen sequence following a successive order of the input data.

Each of the characters are described by a series of 8 bit bytes. As shown for block 33, the first byte would be a command identifier. That would be followed by a byte indicating the type of instruction to follow. In this case, the instruction is a leading instruction indicating the base line location with the base line given in points and designating the displacement of that base line from a referenced position on the print medium, such as the top of the page. As this is the first character a successive byte is a command indicator followed by a byte for a size instruction followed by the point size of the character and followed by the data designation of the character itself, in this case the large A. Since EM square 34 is on the same base line as EM square 33 block 34 may be a byte command identifier, a byte indicating the size instruction with the point size following.

Line rule function 42 is represented by an identifiably different command structure and data structure and is initiated by a command identifier as with blocks 33 and 34 but followed by a line rule instruction, which is then followed by the data designated in the length and width of the line rule.

The input data for blocks 35, 36, 40 and 41 are as shown with each initiated by a command instruction followed by the appropriate size command where a size change takes place as between EM square 35 and 36 and between square 36 and 40.

Where a base line change takes place and a size change takes place as between EM square 40 and EM square 41, base line and size commands are as shown. Character data follows the commands with subsequent character positioned in relation to the immediately preceding character if no placement information is given.

In addition to the identity, form, size and placement of characters, the input device may also supply page variant information; that is, "global commands" which apply to all or a group of characters on a page. Examples of such commands are "wrong reading", which effects a left-right mirror image on the page by flipping the X positions of all characters, and "reverse video" which effects a color reversal for an entire page. For example, with reverse video a page may be imaged as white on black, rather than black on white.

Commands from the input device may also effect a color reversal for a section of a page, such that only a rectilinear portion of the page is white on black rather than black on white.

The font storage unit 2 is essentially a floppy disk reader which may be a part of the input device 1. This font storage unit supplies to the Output Data Processing System 3 digital data defining the font of characters previously selected by the input device 1. This second digital data (as distinguished from the "first" digital data supplied by the input device 1) defines the contour of each character of a font with respect to a normalized encoding set of first and second coordinates. In particular, this second digital data defines the profiles or black white boundaries of each character. If a "profile" is considered to be simply one boundary of a character, it will be seen that any "dark" portion of a character (if the character is dark on a light background) must lie between two profiles (outer boundaries or edges) of the character. By defining all the profiles of the character, with respect to a coordinate set, the "contour", outline or shape of the character is completely defined.

One aspect of this second digital data which defines the contour of each character of a font is that the character contours are defined in terms of a normalized set of coordinates, such as the XY coordinates of a Cartesian coordinate set. The term "normalized" as used herein, is intended to mean that the definition of a character in terms of the coordinate set is only related to any given absolute size or to the final size of the character when it is imaged. Thus, the digital values defining a character in this normalized set of coordinates are the values from which the character is scaled, up or down, to the final output resolution. Unless the scale factor just happens to equal 1 (a unique situation), the character will be defined with a different resolution than the final output.

As an example, the output data processing system 3 is capable of scaling characters with point sizes in the range of 3–130, an expansion factor of 43 to 1. Notwithstanding this range of point sizes, the contour of each character is defined only once with respect to the normalized encoding set of coordinates.

The Output Data Processing System 3 receives the first digital data defining the identity, form, size and placement of characters to be typeset and the second digital data defining the contour of each character of the chosen and produces third digital data defining the character boundaries intersecting a raster line. Third digital data is stored in one or more raster line buffers, also located within the Output Data Processing system, in readiness for the Character Imaging System 4. The raster line storage buffer(s) are preferably formed of a plurality of binary memory elements, each storing a single binary digit corresponding to a respective, unique raster point along the raster line. The line buffer(s) store sufficient raster (third digital data) for a portion of the raster line extending the width of at least several characters. In fact, the line buffer(s) preferably store sufficient data to define an entire raster line extending the complete width of the display.

The information stored in the raster line storage buffer(s) is translated into a raster line image by a Character Imaging System 4 connected to the Output Data Processing System 3. This Character Imaging System creates an image on a print medium for the particular raster line defined by the information stored in the raster line storage buffer(s). A drive mechanism is also provided in the Character Imaging System for moving the print medium in a direction transverse to the direction of the imaged raster line.

The Character Imaging System preferably includes a device, such as a CRT or laser source, for generating a scanning beam and some means, such as beam deflection circuits or a movable mirror, for moving the scanning beam across the print medium in a scan line.

The character imaging system may be any suitable laser scanner or one similar to that disclosed in U.S. Pat. No. 4,270,859, or to that shown in U.S. Pat. No. 3,881,801.

Figure 6:
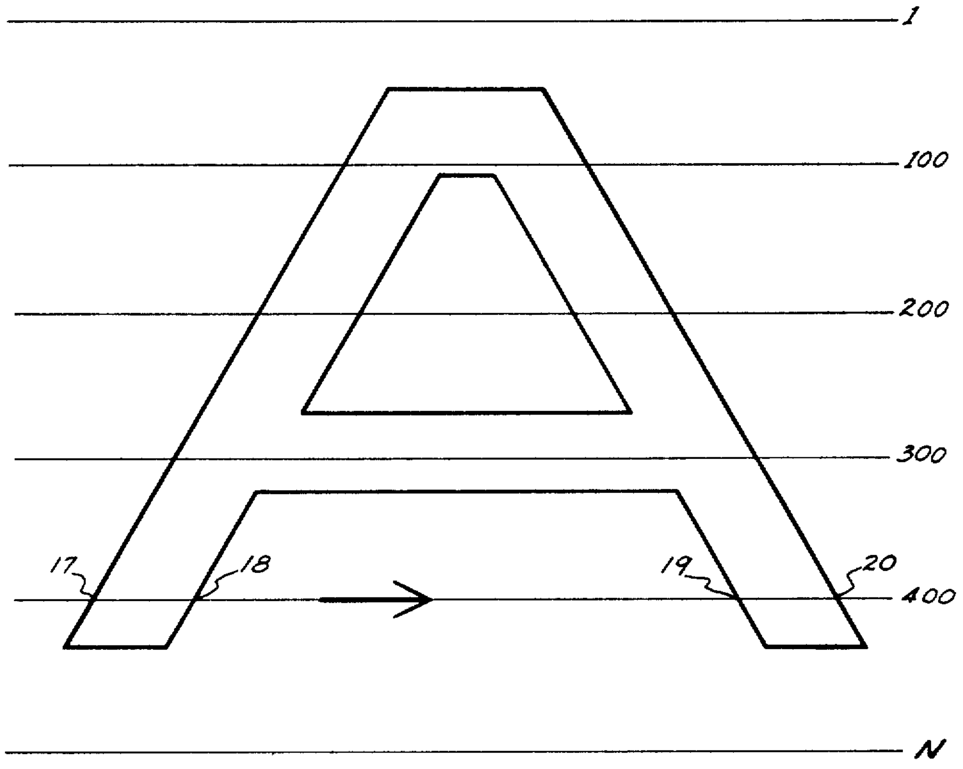
FIG. 6 is a diagram of the raster line intersection points with a character.

The output data system ODS converts the font data and the text input data to character raster line intersection data. Referring to FIG. 6, a series of raster lines 100 to 400 are shown with the character A being imaged on these raster lines. The raster lines are formed by driving a light source across the display. The letters are formed by modulating the light source at the character intersection points. A light beam modulator responsive to intersection data would turn the beam on at point 17 as the raster beam progresses across the page in the direction of the arrow shown with reference to line 400. The raster beam when on, will illuminate that portion of the large A between point 17 and point 18. The ODS similarly would provide a successive located data bit causing the beam to be turned off at point 18. Similarly, the beam would be turned on again by the output data system at point 19 and turned off again at point 20, so the portions of the A between points 17 and 18 and between points 19 and 20 would be illuminated.

Similarly, the output data system would provide data to the beam modulating system to turn the beam on and off appropriately at the correct intersection points of the character boundary with the other raster lines shown as 100, 200, and 300, to illustrate the process, to cause te the A to be fully illuminated on a display. Only a portion of the total raster lines for forming the A in the display are shown.

As the raster lines are being imaged across the page, in ascending order, 1 to n, the character intersection data is being supplied to the beam modulating means in the same order on a real time basis to appropriately turn the beam on and off with the character intersection points.

As stated above, the character data must be presented to the ODS in the same order on a real time basis and related to the ascending order of the raster lines. However, from FIGS. 3 and 4, it can be seen that when the characters are originally composed, the character and data order do not necessarily follow the raster line ascending order.

In this system, each character of a particular size is referenced to a correspondingly sized EM block. The referenced coordinate is the Y coordinate at the upper level 16 and upper left hand corner 15 of the EM block which is referenced to the display raster line intersecting that line coordinate. Successive characters with the same referenced raster line are arranged in segments. The character segments are arranged in the same ascending order as the raster lines and a relation exists between the order of the character data segments and the order of the raster lines.

Unless the text characters are composed to follow the raster line order, then in any sequence of characters, there will occur a sequence of characters such as EM squares 35, 36, 40 and 41 in FIG. 3 where parts of the character will be lost unless the text character sequence is reordered according to the principles of this invention.

The data respective of the character information from store 30, can be placed into the output data system in the order of block 33 followed by block 34 and the ODS system following this order will provide the character intersection data in the appropriate order and consistent with the successively produced raster lines 7-11.

The next series of data provided with the next successive series of raster lines, would be the intersection data for EM squares 35, 36, 40 and 41 within raster lines 19 to 25. As can be seen, the end of the character h for EM square 41 terminates at raster line 23 and no further information is provided in raster lines 24 and 25 for the character of EM square 41.

The output data system as stated computes the character intersection points with each raster line. However, the output data processing system following an established character sequence, is not initiated until the occurrence of a generated raster line with reference raster line for the first character appearing in data, the A of EM square 33. As the reference raster line for the first character large A of EM square 33 is 7, the ODS will start generating character intersection data at the start of raster line 7. As can be seen from FIG. 3, there are no other character intersection points for raster line 7 and the beam would be unmodulated for the length of that raster line and for the same length of raster line 8.

However, in the case of successive raster lines 9, 10, and 11, the beam is blanked and then unblanked to form the characters "A" and "a".

However, a different situation exists for the characters of EM squares 35 through 41 and for line rule function 42. As can be seen the reference raster lines are 22 for EM squares 33, 20 for EM squares 36, 19 for EM square 40 and 20 for EM square 41.

Where the output data system computes character intersection points at the occurrence of a raster line with the reference raster line for the data of the next successive block presented to it and ignoring line rule function 42 for the moment, the next data presented to the output data system following the input sequence of data on FIGS. 3 and 4, would be block 35. The output data system would than start computing intersection points at raster line 22 representing the reference raster line for block 35, block 35 being the next successive block of data presented in the succession of data loaded on the input system disc. The output data system would then develop the intersection points for the character represented by blocks 36, 40 and 41 at the raster line 22.

It can be seen at this point that if the output data system develops intersection data consistent with the sequence that the information is placed into the system during the composing of the page, then the intersection points for the characters of EM squares and blocks 36, 40 and 41 would not be developed on a real time basis until raster line 22, the reference raster line for the next successive block 35 in the character input sequence. At this point, however, on a real time basis, the raster line generating system already would have passed lines 19 to 21 which intersect with portions of the characters of EM squares 36, 40 and 41. It will be impossible on a real time basis and without reversing the direction of the raster to image that information as the raster line proceeds in one direction in ascending order down the page.

Proceeding down the series of raster lines 22 through 25, it can be seen that all the lower portions of the characters on the display will be filled in by the appropriate character intersection data. In particular, it can be seen that in a raster system where the raster lines are generated in ascending order and in a single direction, and where characters are located on common raster lines but have portions located on noncommon raster lines and a first character displaced from a second character in the direction of a single raster line is located on at least one noncommon raster lines having a lower ascending value relative to the raster lines order, then the sequence of the character data followed when computing the raster intersection points becomes important. The data presented to the output data system is used to develop the intersection points on a real time basis. Where that order, as explained above, would present character data having a referenced raster line value higher in ascending value then successive characters, then portions of the successive characters having a lower ascending reference raster value will be lost.

Such an order would follow where a composer following the normal convention of writing would insert first the data for EM square 33 in block 33, then the data of EM square 34 in block 34, the data of line rule 42, in block 42 and proceed down the page with data of EM square 35 in block 35, then block 36, block 40 and block 41 for EM square 36, 40 and 41 respectively.

The Output Data System (ODS) which generates the character intersection points is now explained.

Figure 7:
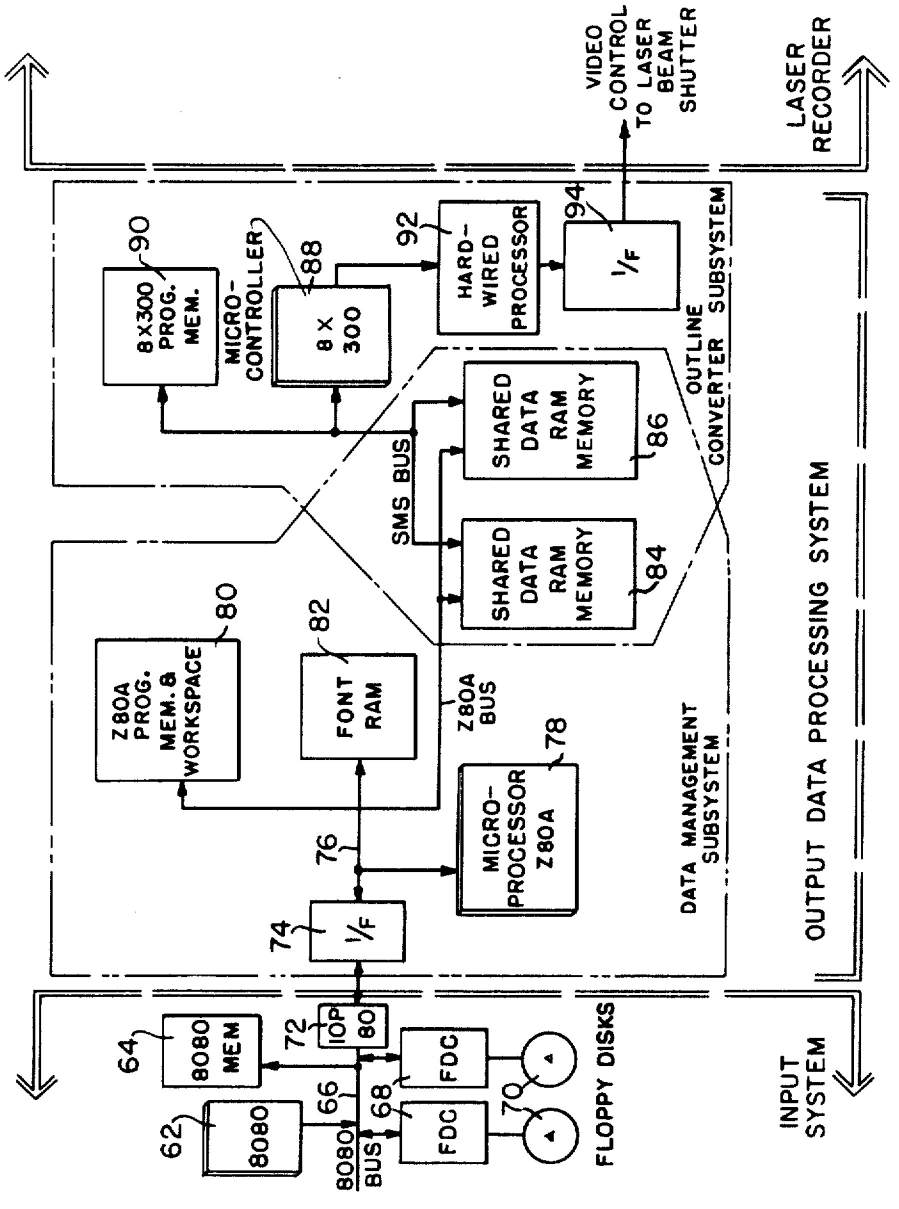
FIG. 7 is a block diagram of the Output data processing system in the system of FIG. 1.
Figure 8:
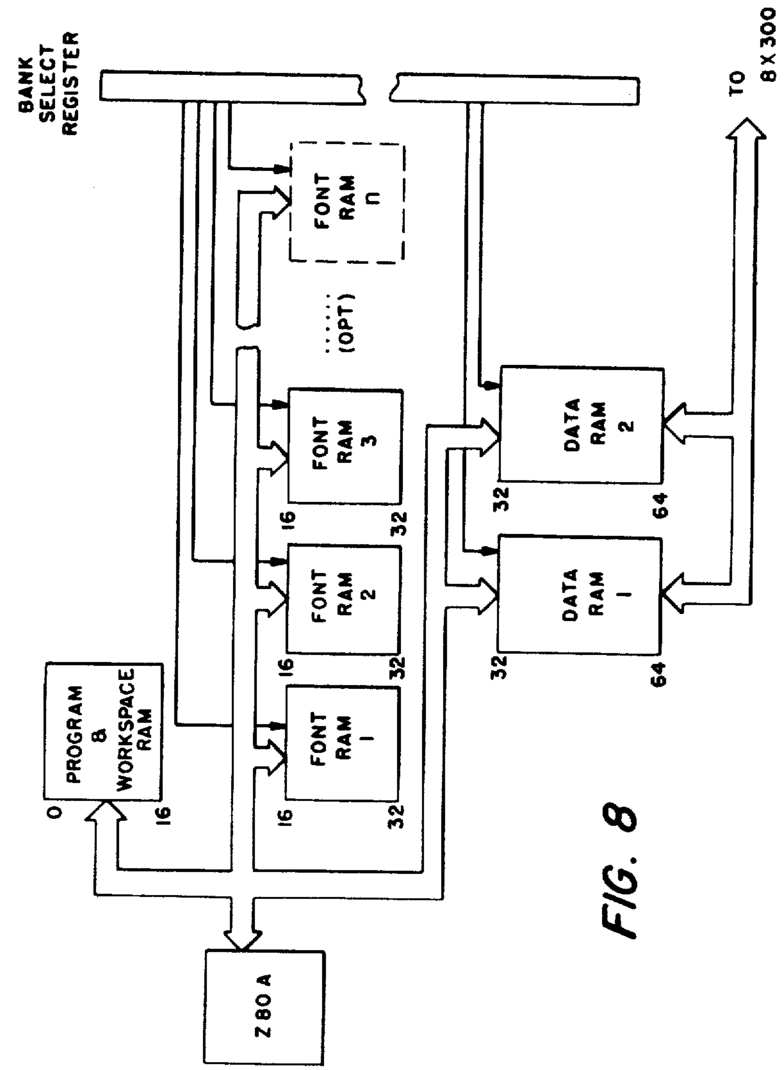
FIG. 8 is a block diagram of the data management subsystem in the input data processing system of FIG. 7.
Figure 9:
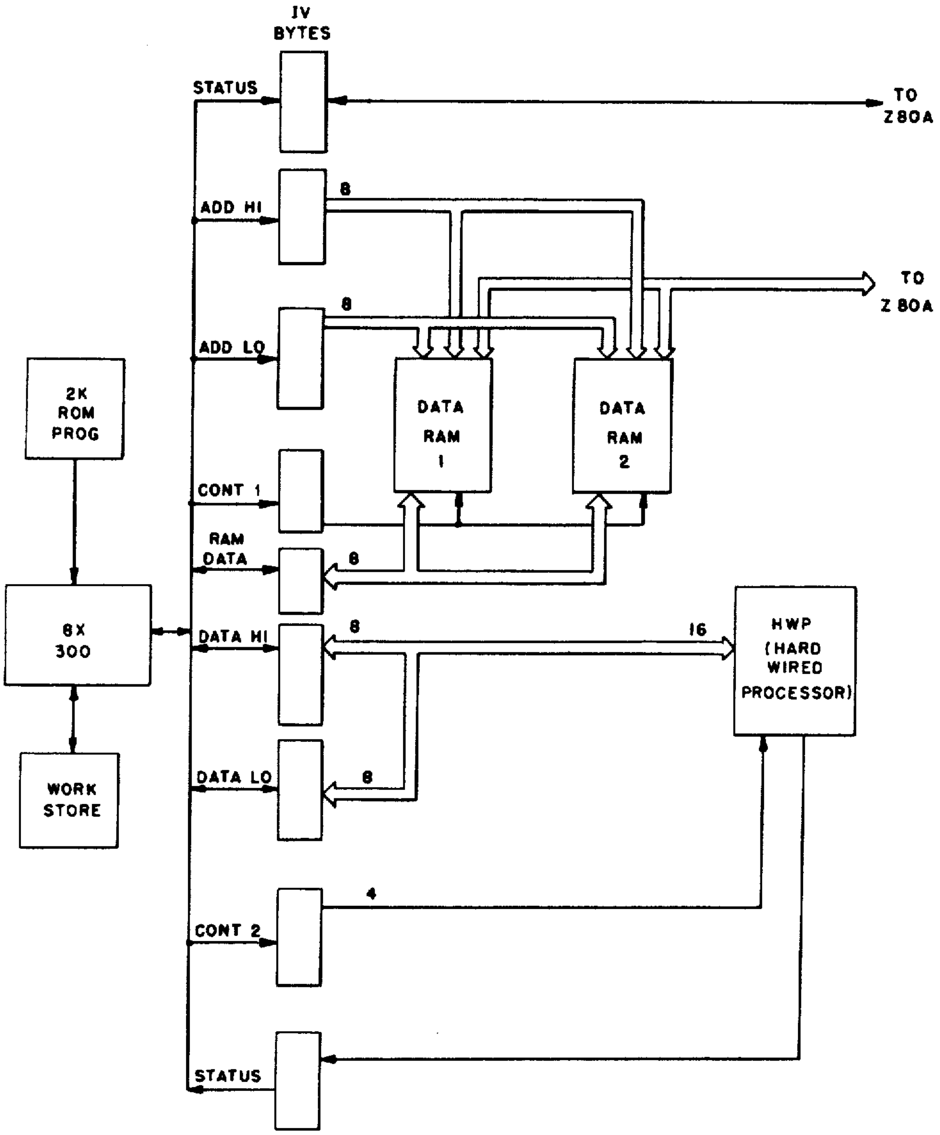
FIG. 9 is a block diagram of the Outline Converter Subsystem in the Output Data Processing System of FIG. 7.

This system rearranges the order of the input data and loads that data in its new order into the ODS Data Rams of FIGS. 7, 8 and 9 in a new sequence corresponding to the ascending order of the raster lines.

The manner in which the character data and font data is loaded into the data rams is described with regard to FIGS. 7 to 16.

OUTPUT DATA PROCESSING SYSTEM

General

The Output Data Processing System is responsible for computing the horizontal coordinates, on the page to be typeset, at which the laser scanning beam must be turned on or off for each and every raster line on the page. Its computation is based upon the particular raster line which is required (depth down the page); on the particular characters (i.e., identity) which are to be set at that point on the page; and on the form and size as well as the shape of these characters as defined by the Input System.

Since the conversion from the "second" digital data, defining the contour of the characters to be set, into raster data is complex, and since the raster output form requires repeated, multiple character data access, the time required for computation of each raster line becomes a significant factor in the system architecture. In an effort to minimize the computation time, the Output Data Processing System has been divided into two major subsystems:

(1) The Data Management Subsystem (DMS) and, (2) The Outline Converter Subsystem (OCS).

A Z80A microprocessor is used in the former and an 8X300 (or "SMS 300") microcontroller with a hardwired processor is used in the latter.

FIG. 7 shows the Output Data Processing System in block form. This system receives the first digital data defining the identity, form, size and placement of the characters to be typeset as well as the second digital data defining the contour of each character from a common Input System. The Input System operates with a programmed 8080 microcomputer 62 supported by a RAM 64 of suitable size. The microcomputer and memory are arranged on a 8080 bus 66 as are two floppy disk read/write units comprising floppy disk controllers 68 and the disks 70 themselves. One disk 70 contains the text information or "first" digital data, while the other disk contains the font information or "second" digital data. The bus terminates in an IOP80 interface 72 which communicates with an interface 74 in the Output Data Processing System. This latter interface is arranged on a Z80A bus 76 as are the Z80A microprocessor 78 and four memory units 80, 82, 84 and 86 of the Data Management Subsystem.

The memory unit 80 serves to store the program for the Z80A microprocessor 78 and is a workspace for the microprocessor computations. The memory 82, called a "font RAM", stores the second digital data defining the characters of the chosen font. This data is processed and supplied in a convenient form, which will be described in detail below, to two memories 84 and 86 called "Data RAM's".

The Data RAM's 84 and 86 are "shared" by the Data Management Subsystem and the Outline Converter Subsystem. Basically, the Z80A microprocessor supplies data to these RAM's and the 8X300 microcontroller 88 receives and analyzes this data, under control of a program stored in another memory 90, and supplies pertinent data to a hardwired processor 92. This hardwired processor converts the data into the so-called "third" digital data which is stored in three raster line buffers. The information contained in these buffers is then converted into a video control signal by an interface 94 and supplied to the laser recorder in synchronism with the movement of the scanning beam.

Data Management Subsystem

The circuit blocks and their interconnections employed in the Data Management Subsystem are shown in FIG. 8. In general, the responsibility of the Data Management Subsystem is to organize and supply data to the memory shared with the Outline Converter Subsystem so as to facilitate rapid processing by the Outline Converter Subsystem. More specifically, the Data Management Subsystem executes the following process steps:

(a) When ready, read the next required typographical "line segments" into a Data RAM memory file from the text floppy disk.

(b) Transfer the font data from the font floppy disk to one of the font RAM memories for a "font data file".

(c) Set-up an "outline file" in the Data RAM for the Outline Converter Subsystem. This file contains the X and Y start points of each outline of each character required, as well as "vector" data defining the contour of each character.

(d) Revise the "line segments file" by replacing the character number with the location of the outline file.

(e) Repeat the above steps until no memory storage area is available for the line segments file or the outline file.

(f) Pass control to the Outline Converter Subsystem. Restart on the other Data RAM.

Outline Converter Subsystem

The integrated circuits and interconnectors forming the Outline Converter Subsystem are shown in FIG. 9. Basically, the responsibility of the Outline Converter Subsystem is to convert the outline or contour data stored in the shared Data RAM into horizontal stroke data for the laser recorder. More specifically, the Outline Converter Subsystem executes the following process steps:

(a) Read the identifying data and size data for the first line segment.
(b) Read the distance from the margin to the left side bearing (LSB). Store in an X register.
(c) Read the outline start data for the next character, compute the distance from the LSB of the character to the outline. When necessary, fetch new outline vector data to update the X,Y start data.
(d) Output the sum of this value and the current X value (located in a "X" register) to the appropriate raster line buffer.
(e) Read the next outline(s); repeat step (c) until all outlines have been computed at the level on the page being set.
(f) Read distance to the LSB of the next character; add this to the X register.
(g) Repeat steps (c) through (f) until all characters in the line segment have been computed and output. Then repeat steps (a) through (f) for all other line segments on this level.
(h) When all line segments on this level have been computed, transfer control of the raster line buffer(s) to the laser driver system, and start storing data in an alternate (next) raster buffer for the raster line 1/10th point down the page.

FONT DATA DESCRIPTION

General

The second digital data defining the characters of each desired font is stored on the font floppy disk. This data is of the "outline" type; that is, it defines the contour of each character with respect to a normalized encoding set of coordinates. In order to compress data, not all the character edge points on the resolution matrix are encoded. The general nature of the encoding scheme is described in the above-referenced, commonly-owned U.S. Pat. No. 4,199,815 and entitled "Character Generating Method and Apparatus".

Details of the Font Data Structure are shown in commonly owned U.S. Pat. No. 4,231,096.

Character Digitization

Character Definitions

All characters are digitally encoded or "digitized" for an outline, relative vector decoding system, where all character outlines are assumed to be closely approximated by straight line elements. Such a system is disclosed in the commonly-owned U.S. Pat. No. 4,199,815, referred to above.

All characters are defined as a multiple series of "curves". Each curve describes a vertical outline edge with the following components:

(a) An X, Y coordinate defining the highest point of the curve within an em square;
(b) A white-to-black or black-to-white bound;
(c) A series of straight line segments, defined by a series of data bytes which define the slope and length of each segment of the curve; and
(d) Vector direction (downward and left-to-right or right-to-left) of the segments.

Defining the character consists of listing all the curves which outline the character. They are listed in descending order; that is, the curves that start at the top of the character are listed first and the bottom last.

Scale

The principal unit of measurement is the Data Resolution Unit (DRU) which is defined as 1/432 of the traditional em. An extended em square is 576×576 DRU's.

Position 0,0 is located at the intersection of the left side bearing (LSB) and the top of the extended em square as illustrated in FIG. 2. Therefore, X (leftright) values can be positive (positive is right) or negative (if a character bound extends to the left of the left side bearing (LSB), but Y (up-down) values will always be positive (positive is down).

Outline Data Words

Figure 10:
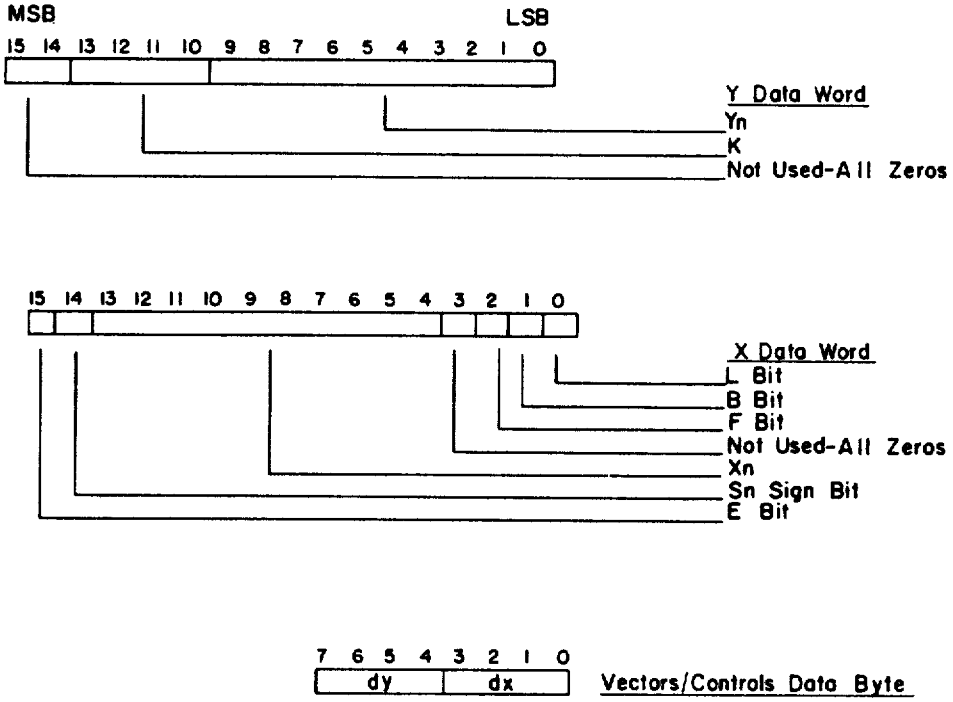
FIG. 10 is a diagram showing the structure of the outline data words contained in the Outline Data Font File in the Font File.

Each outline will be defined by 3 or more data words: a Y word, an X word, and one or more outline (vector/-control) bytes. The format of these data words is shown in FIG. 10. The various parts of the coding shown in FIG. 10 are specified below:

Y Data Word Components

Yn—This data defines the vertical position of a start point from the upper edge of the extended em.
K—Undefined.

X Data Word Components

Xn—This data defines the horizontal position of a start point. The left side bearing (LBS) is defined as 0.
X Sign—The sign bit defines the displacement direction of Xn with respect to the LSB.
L Bit—The L Bit defines the direction of the dx of the first vector. A one defines a left pointing vector, a zero defines right pointing.
F Bit—The F Bit or "Flare Bit" defines which vector slope will be used by the decoder in extrapolating the character outline in the region of the grid immediately above the line Yn.
E Bit—The E Bit or "Extrapolation Bit" defines whether extrapolation is or is not used above the start point grid line Yn.
B Bit—The B Bit is the "Boundary On/Off Bit" and defines whether the outline is a left-side (on) boundary or a right-side (off) boundary.

Vectors/Controls Data Byte Components

Vectors dydx—For all values of dy greater than 0, this byte defines the slope of the vector outline of the character from the start point (Xn Yn), or from the last vector end point. All vectors are sequenced serially in the same sequence that they occur on the character outline.

Controls

For all values of dy=0, this byte defines a control code. The specific control is dependent upon the value of dx (in hexadecimal notation) as indicated below:

0—End of outline.

1—Reverse the dx direction for the next vector.

2—Defines that there are no displacement vectors applicable to the start point defined by the preceding Y and X Data Words. This control is always followed by a zero byte to produce an "End of Outline" control code.

3—Defines the vector with a horizontal displacement of 0 DRU's (a vertical vector) and a vertical displacement greater than 30 DRU's. The next data byte defines the binary value of the vertical displacement. The data byte has a resultant range of vertical displacements of 0 to 255 inclusive, but it is not utilized between 0 and 30 inclusive. (Example: The two bytes 0/3, 2/6 describe a composite vector that goes vertically down 38 DRU's.)

4—Defines a vector with a horizontal displacement of 1 DRU and a vertical displacement of 30 DRU's.

5—Defines a vector with a horizontal displacement of 1 DRU and a vertical displacement of 120 DRU's. 7 through C—Undefined D—Defines a rectilinear outline change with a vertical displacement of 1 DRU and a horizontal displacement of up to 255 DRU's. The next data byte defines the binary value of the horizontal displacement. (Example: The two bytes o/D, 2/6 describe an outline made up of 1 DRU vertical and a 38 DRU horizontal displacement.)

E—Defines a rectilinear outline change with a vertical displacement of 1 DRU and a horizontal displacement greater than 255 DRU's. The next data byte defines the binary value of the horizontal displacement in excess of 256. (Example: The two bytes o/E, 2/6 describe an outline made up of a 1 DRU vertical and a 294 DRU horizontal displacement.)

F—Defines a shallow slope vector with a vertical displacement of 1 DRU and a horizontal displacement greater than 15 DRU's. The next data byte defines the binary value of the horizontal displacement. (Example: The two bytes O/F, 2/6 describe a composite vector that goes over 38 horizontal DRU's and down one DRU.)

Outline Data File Structure

Figure 11:
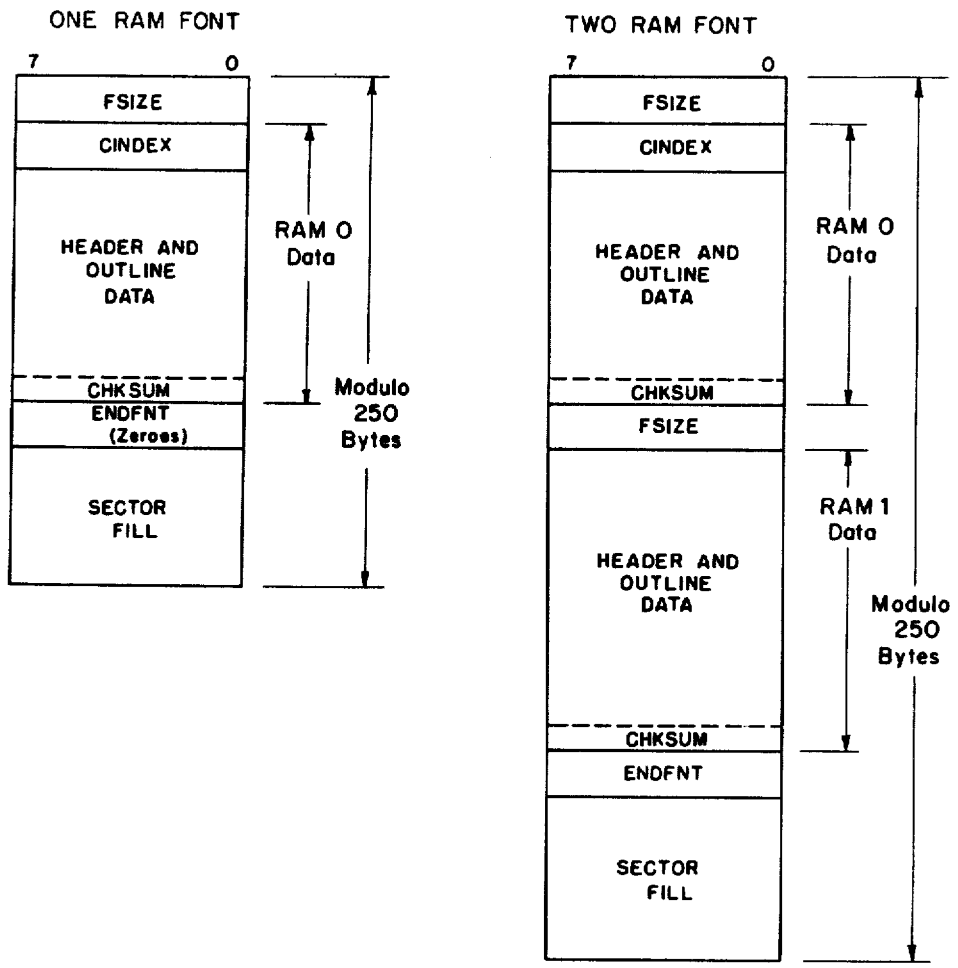
FIG. 11 is a diagram showing how the Outline Data File is arranged on a floppy disk.

The Outline Data File resides on the font floppy disk, and stores a memory image of the data that will be loaded into one or more Font RAMs. The file occupies one or more sectors on the disk, and accordingly it is modulo 125 words long. FIG. 11 illustrates the file structure.

If the total font outline data is less than 16,384 bytes, then the Outline Data File will contain:

1. FSIZE word (No. of bytes in RAM)
2a. CINDEX (Character Index)
2b. Header and Outline Data
3. ENDFNT (Zero word)
4. Sector filler Items 2a and 2b comprise the RAM memory image, and may not exceed 16,384 bytes.

If the total font outline data exceeds 16K bytes, the File will contain:

1. FSIZE word
2ab. CINDEX, Header and Outline Data (16,384 bytes max.)
3. FSIZE word (No. of Bytes in next RAM)
4. Header and Outline Data (16,384 bytes max.)
5. ENDFNT
6. Sector filler Items 3 and 4 may be repeated as required if the total font outline data exceeds 32,768 or 49,152 bytes. The data will occupy the Font RAM beginning at address "4000 and may fill through to address "7FFF (where the initial quotation mark (") indicates a hexidecimal number. Addresses in the headers will be absolute; addresses in the CINDEX will be offset absolute ("0000 through "3FFF) with the two MSB's flagging multi-RAM locations.

The specific contents of the Outline Data File are as follows:

FSIZE

This word defines in binary the number of bytes to be loaded into a Font RAM. The count does not include the FSIZE word or the ENDFNT word. The count for the first Font RAM includes the entire CINDEX and all header and outline data.

CINDEX

The character index is variable length and consists of a character count (CCOUNT) and a relative addressed index.

The CCOUNT is one byte defining in binary the number of characters in the font, and therefore it also defines the word length of the index. It will be a number between 1 and 255 inclusive. The RAM address location of CCOUNT is "4000.

The index contains a one word entry for each character in the font. Each entry is the offset absolute address of the YCOUNT byte for the character.

The two most significant bits of word indicate in binary the RAM that contains the character, where 00 is the RAM that contains the index. The 14 least significant bits contain the offset RAM address (the absolute RAM address less "4000) of the YCOUNT byte of the character.

The first entry in the index is by definition character number 1 and must correspond with the first character width group in the Character Width File. Character numbers proceed sequentially by implication (there are no expressed character numbers or library numbers at any location in the font).

ENDFNT

This word defines the end of all font data and consists of 2 bytes of zeros.

Sector Filler

Zero data is used to fill through to the end of the floppy disk sector that contains the ENDFNT word.

Header and Outline Data

The header and outline data in each RAM contains all of the character digitization data pertaining to each of the characters located within that RAM. The X and Y start locations for characters are listed in the Header File; the vectors and control bytes that define the profiles of characters are listed in the Outline File. The two files are separated by a zero data byte (ENDHDR).

Figure 12:
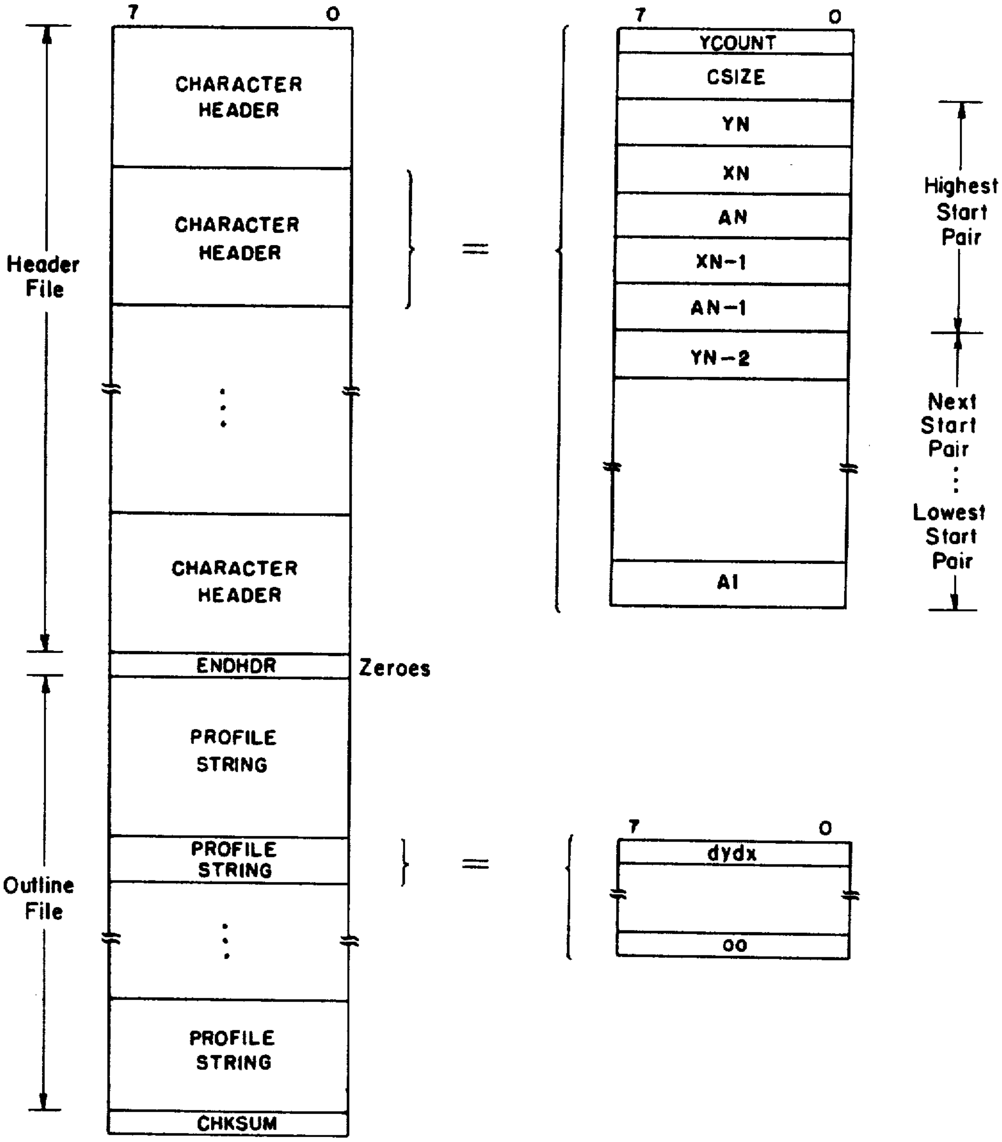
FIG. 12 is a diagram showing the structure of the header and outline data contained in the Outline Data File of FIG. 11.

FIG. 12 illustrates the file structure of the Header and Outline Data.

A checksum byte follows the Outline File and immediately precedes the ENDFNT word or the FSIZE word that separates RAMs.

Header File

The Header File consists of a series of character headers, one for each character in the font. There is no space between headers. Each character header contains (in sequence and without space) a YCOUNT byte, a CSIZE word, and one or more start-pair sets of data words (one set for each pair of starts).

YCOUNT

The YCOUNT byte defines in binary the number of YN entries in the header, which is the same as the number of start pairs. The length in each character header is ten times the YCOUNT plus 3 bytes.

CSIZE

The CSIZE word defines in binary the total amount of data space in bytes that the character fills when loaded once into the Data RAM. Accordingly, it is equal to twelve times the YCOUNT plus the length of all the profile strings addressed within the start-pair data sets.

START-PAIR DATA

YN is the Y Data Word and XN is the X Data Word as defined in 2.4.3. N must be even, since outlines always start in pairs. AN is the absolute address of the initial byte of the profile string of vectors and controls that define each outline shape. Each address will be a number between "4000" and "7FFF. Addresses may be duplicated within the header file in the event that a profile string is shared (the character outline shape is common) for more than one start point. An address may not point to a profile string located in another RAM. The YN, XN, and AN Data Words are sequenced as shown in FIG. 12 and listed without space. Each successive YN value is equal to or larger than the preceding YN value.

Outline File

The Outline File consists of a series of profile strings. Each profile string is a sequential series of two or more Vectors/Controls Data Bytes, as defined in 2.4.3. Each string defines a unique vertical character outline and begins at the header start point. A string is terminated by control 0 (end of outline), which is a zero data byte. Filler bytes may not be used within a string; they are permissible before or after any string. The digitization program(s) avoids duplication of identical profile strings, and minimizes the number of RAMS a font used by sharing profile strings for character outlines that closely approximate each other.

CHKSUM

A one byte checksum verifies each complete RAM; it is formed with all of the data in the Font-RAM except the CHKSUM byte itself. The checksum shall be formed by initializing to zero; then, for each byte, the checksum is rotated right one bit (LSB becomes MSB) and the data byte is added to form the new checksum. Overflow on the addition is ignored. The final 8 bit checksum is defined as CHKSUM and is entered after the last data byte.

Profile Strings

In general, the profile strings in the Outline Data File are separated from the start points (YN and XN) to permit several start points to reference (address) the same profile string. In this way, different characters within the same font having, as a part thereof, the same basic shape may be defined by the same data, thus achieving data compression.

For example, the following letters may have the identical contour on their left-hand side: "o", "c", and "e". The Outline Data File will thus contain two profile strings defining the inner and outer boundaries on the left-hand sides of these characters. The highest pair of start points in the character header for the "o", "c" and "e", respectively, may therefore address these two profile strings.

Because the dx values in the profile strings may be either positive or negative, depending upon the "L bit" in the X data word (XN), a single profile string can serve for various characters which are symmetrical. For example, portions of the character "b" may be symmetrical with the character "d" and portions of the character "p" may be symmetrical with the character "q". Such characters may be defined with the same profile strings which are directed by the "L bit" to move in opposite directions.

In general, character designers (persons who design character fonts) tend to create a few basic character shapes which are repeated throughout the font, either directly or in mirror image. Consistency dictates that a few shapes be repeated throughout the font; symmetry dictates that mirror images be used. The profile strings utilized in the digital definition of characters in the present system are a useful tool in recreating these basic character shapes. Because the encoding scheme permits the addressing of a single profile string from the start points of various characters, and permits the dx increments in a profile string to have positive or negative values, the quantity of data required to define an entire font is substantially reduced.

Miscellaneous

Within the definition of a single character, there is no restriction on starting two outlines (profile strings) from the same point. There is also no restriction on ending two outlines at the same point. Two outlines may touch, but they may not cross over each other if they change from "on" outlines to "off" outlines.

Broken characters are also permissible in the Outline Data File. There is no restriction on broken (divided, separated) characters.

Font RAM Format

The DMS utilizes RAM memory to contain the font data for the font(s) to be typeset on the page in order to have high-speed access to this data. The data for the font is supplied to the DMS by the Input System where it is stored on the System Floppy Disk (SFD).

A complete font is stored on one or more Font RAMs, each Font RAM storing no more than one font at a time.

The DMS can contain one to eight Font RAMS. The system will function with only one Font RAM, provided that one Font RAM size fonts are used. Multiple Font RAMs ensure against degradation in throughput speed on pages with font mixing.

Each Font RAM is 16 K bytes; each Font RAM card can contain up to 64 K bytes of memory: the equivalent of 4 Font RAMS. Units of less than four fonts can be accomplished by depopulating the Font RAM cards in 16 K byte increments.

At system reset, the DMS determines which Font RAMs are available for loading by writing a pattern into each RAM location and reading back the results. Any mismatch is recorded as an inactive font position in a font table. After testing each of the eight locations, a message is sent to the Input System defining the number of active Font RAMs; this can be utilized to detect defective RAMs. The font table is used later to record the font numbers stored in each RAM.

In the process of developing a Data RAM, the DMS copies spcific character outline data from the Font RAM into the outline file in the Data RAM. If a font change occurs, the DMS will search the table of font numbers loaded. If the font is not already loaded, the DMS will load the new font into the first empty Font RAM(s). If all Font RAMs are in use, the RAM or RAMs least recently used are overwritten with the new font needed.

The data stored in the font RAM is identical in content and structure to the Outline Data File front data on the Input System floppy disk, as defined in Section 2.4.4.

In addition to the font data stored on the Font RAM card(s), the DMS maintains two additional tables per font in the program workspace that are used to regulate data transfer from Font RAM to Data RAM: an In-Seg Table and an In-RAM Table. These are described below.

In-RAM Table

This 512 byte table contains the address within the Data RAM where a character header has been stored. The table is ordered in accordance with the character numbers. Each entry is two bytes. A zero entry indicates that the character data has not been loaded.

Whenever a new character is put into the Data RAM, the corresponding 2 bytes in this table are loaded with the Data RAM address. This table is cleared at the start of building each new Data RAM.

In-Seg Table

This 32 byte table is used to indicate which characters of the font have already been encountered within the line segment currently being developed in the Data RAM. Whenever an address is loaded into the In-RAM Table, a bit is correspondingly set in this table. This table is cleared at the start of each new set level (YSL).

In structure, each bit corresponds to a character number between 0 and 255 inclusive. The address of the bit is computed by:

$$\frac{\text{Char. Number}}{8} = Q + R \text{ (Quotient integer and Remainder integer)}$$

where Q is the byte in the table and R is the bit within the byte.

PAGE DATA DESCRIPTION

Page Definition

A page position is defined by X, Y coordinates in 1/10 pts. This is called a raster resolution unit (RRU). The top left hand corner is position 0,0. The maximum page size is 11″×17″. That is 7954×12,292 RRU. Movement in a page can only be from top to bottom.

The raster position being solved for at any time is called the Y set level (YSL). This value initially starts at 0 and is incremented by one until it reaches the maximum page depth.

Page Variants

In addition to the normal standard page form defined by section 3.1, five full page variants have been incorporated in the ODS design. All variants are mutually exclusive.

High Resolution

A high resolution laser recorder can have its drum drive gear ratio altered so that each step of the stepper motor 58 drives the drum 56 by 1/20th pt., a high resolution RRU (HRRRU). Horizontal (x) resolution is not increased.

The ODS has a chip switch on the DMS (Z80A) microprocessor which is set for this laser recorder. The DMS halves the ΔYs, and the OCS increments the set level on every other raster output.

Proof Page

A laser recorder with proof page capability would make 2 stepper motor steps between each raster line, effectively doubling the speed of page setting with proof quality.

The command for proof page will be entered from the Input System. The DMS will set the Ys level depending upon whether the laser recorder is a normal or a high resolution unit, and the OCS will accordingly increment the set level by one or two on each raster output.

Page Width

The laser recorder will have either an 8½″ or a 11″ wide drum 56.

The ODS has a chip switch on the DMS (Z80A) microprocessor which is set for 8½″ or 11″. The DMS uses an appropriate page width when page complementing the XPOS value for wrong reading output.

Wrong Reading

Any page can be output from any type of laser recorder in right reading or wrong reading (mirror image).

Selection of wrong reading is made by a toggle switch on the DMS (Z80A) microprocessor. The DMS page complements the XPOS location of every character, and complements the X position of every outline on each character and the direction that each outline moves.

Reverse Video

Any page can be output white-on-black or black-on-white (reversed normal).

Selection of reverse video is made by toggle switch on the hardwired processor (HWP). The HWP inverts the polarity of the raster.

Line Rule

Line rule is similar to reverse video, except that an entire line (white-on-black or black-on-white) of defined length becomes a single solid color. This command permits generation of line rules on the page.

INPUT SYSTEM INTERFACE SPECIFICATION

General

This specification sets forth the required data and data format to be transmitted between the Input System and the Output Data Processing System. The transmissions are made through the Input System IOP-80 on a handshake basis of a byte serial transfer. Table 1 summarizes all the interface transmissions to the ODP System.

TABLE 1

| SUMMARY OF INTERFACE TRANSMISSIONS | INPUTS TO ODP SYSTEM FROM INPUT SYSTEM |
|---|---|
| CONTROL TRANSMISSIONS 8 BIT BYTE & CTL = 1 | NEW PAGE READY<br>RESTART REQUEST<br>RESET REQUEST<br>PROOF PAGE<br>START PROG STORE<br>PROG STORE FAULT |
| DATA TRANSMISSIONS 16 BITS (TWO BYTES) & CTL = 0 | PROGRAM DATA<br>PAGE DATA<br>FONT DATA |

Page Data:

The Output Data Processing System is a page output machine, principally because the laser recorder must expend the time required to expose a full raster even if it only had data for part of a raster. Therefore the throughput of the machine is enhanced significantly by supplying the laser recorder with all of the graphic data needed in each full raster prior to exposing the raster. This requires storing and regrouping random sequence input data into a top down sequence. Due to memory size limitations in the Output Data Processing System, the data must be further packeted into groups defined as "line segments", which is the standard unit of page data to be transmitted by the Input System. Section 4.2 will detail the page data requirements.

Font Data

The Input System stores digital outline fonts on floppy disks in the manner described above. The outline data is required in the solution of the raster on-off points, and this data is transmitted by the Input System on a whole font basis (excluding width data, BLJ data, etc.). Section 4.3 will detail the font data requirements.

Other Data

In addition to the above job related data, periodic data transfers may be made by the Input System, if desired. These include programs, error messages, restart and program reset. The power-on reset signal may also originate in the Input System.

Notation

Meta-Language notation will be used to describe the syntax of the data requirements. The following notation will be used:

- " " Terminal—a fixed bit length symbol element (e.g.: all page data elements are 16 bit words).
- ( ) Non-Terminal—A higher order language element which is composed of one or more terminals and/or one or more non-terminals.
- ( ) Optional Repeats—The braces indicate that the enclosed non-terminal(s) may be not used or used as often as desired.
- / Either-Or—A slash indicates that the non-terminals on either side of the slash are possible alternative elements.
- * Once only—An asterisk is used to indicate that the non-terminal may not be used more than once within the complex non-terminal being defined.

Page Data

Page Data Structure

As outlined in above, coded data which describes a page must be packeted into groups defined as "line segments":

(PAGE)={(LINE SEG)} "END PAGE"

Each page can consist of one or more line segments followed by an end page code. A blank page has no line segments. The end page code is a terminating code, and no data relating to the page can be accepted after the code. All functional data received prior to the end page code is not carried over into the next page, and must be repeated as needed.

Each line segment defines a character set, a reverse video set, a line rule set or sector overflow.

(LINE SEG)=(SEG#)*(YPOS)*{(CHAR SET)/(RVSET)/(LR SET)} "END SEG"

The first element in each line segment is the segment number. Separate line segments with unique segment numbers must be defined for each character set with a unique YPOS and point size combination. Separate line segments should preferably be defined for each reverse video or line rule set, and also preferably for a set that is not contained within the Y limits of the extended em square of a character set. All reverse video or line rule sets within a single line segment must have the same YPOS value.

The segment number is followed by YPOS, which nominally is the Y coordinate on the page of the top of the extended em square of the characters in the line segment and/or the upper coordinate of the reverse video or line rule set(s) in the line segment. All the line segments on the page must be sequenced in the order of the YPOS coordinate; there is no sequence requirement between line segments with the same YPOS coordinate.

The line segment can contain one or more character sets, and/or one or more reverse video and/or line rule sets.

The end segment code is a terminating code, and no data relating to the segment can be accepted after the code. All functional data received prior to the end segment code is not carried over to the next segment, and must be repeated as needed.

Character Sets

All character sets within a line segment must follow the structure:

(CHAR SET)=(INITIAL CHAR) {(CHAR PAIR)} with one initial character followed by one or more character pairs. The initial character must follow the structure:

(INITIAL CHAR)=(PT SIZE)* (FONT) (XPOS) (CHAR PAIR)

The initial character in a line segment must contain a size, a font number, the x coordinate of the character's left side bearing (XPOS), and the character pair data which is structured:

(CHAR PAIR)={(FUNCION)} "CHAR"

and where permissible functions are:

(FUNCTION)=(XPOS)/(FONT)/(SET WIDTH)/(SLANT)/(BLJ)/(YLOW)

The character code is partially a terminating code, that is, although no functions relating to a particular character can be accepted after the code, all functional data received prior to the code is carried over and remains valid until altered by a new function code or a line segment terminating code (END SEG).

All latest function codes are valid in this manner until altered except YLOW, which can only be altered by the issuance of a numerically higher valued YLOW.

Within a character set, an initial character must precede any follow-on character pairs. All other functional codes may be sequenced randomly, subject only to the restrictions described above.

Reverse Video Sets

All reverse video sets within a line segment must follow the structure:

(RV SET)=(XPOS) (RV CODE) (YEND) (XEND)

The elements of the reverse video set must be sequenced in the above order with no intervening elements.

Line Rule Sets

All line rule sets within a line segment must follow the structure:

(LR SET)=(XPOS) (LR CODE) (YEND) (XEND)

The elements of the line rule set must be sequenced in the above order with no intervening elements.

Table 2 summarizes the syntax of the page data structure:

TABLE 2

| PAGE DATA SYNTAX |
|---|
| (PAGE) = {(LINE SEQ)} "END PAGE" |
| (LINE SEG) = (SEG#)*(YPOS)*{(CHAR SET)/(RV SET)/(LR SET)} "END SEG" |
| (CHAR SET) = (INITIAL CHAR) {(CHAR PAIR)} |
| (INITIAL CHAR) = (PT SIZE)*(FONT) (XPOS) (CHAR PAIR) |
| (CHAR PAIR = {(FUNCTION)} "CHAR" |
| (FUNCTION) = (XPOS)/(FONT)/(SET WIDTH)/(SLANT)/(BLJ)/(YLOW) |
| (RV SET) = (XPOS) (RV CODE) (YEND) (XEND) |
| (LR SET) = (XPOS) (LR CODE) (YEND) (XEND) |

4.2.2 Input Codes/Terminal Elements

Table 3 summarizes the input code structure for those terminal elements which are to be sent from the Input System to the Output Data Processing System, with references to the following descriptions of the terminal elements used in the syntax in section 4.2.1.

4.2.2.1 (SEG#)="SEG#"

This is a 13 bit number (the LSB's of the 16 bit field, the 3 MSB's shall be 0's) unique to each line sement in the page. It is the number used to identify each line segment, and will be used by the Output Data Processing System when it needs to call for a specific line segment. It must be the first code of every line segment, and may not be issued more than once in any line segment.

Segment numbers may be any number between 1 and 8191 inclusive (not zero), and it is not required that the segment numbers be sequenced with increasing YPOS values.

(YPOS)-"YPOS"

This is the Y coordinate on the page in RRU's of the top of the extended em square of the characters in the line segment and/or the upper coordinate of the reverse video set in the line segment. The top of the page (which is nominally below the top of the sheet of paper) is defined as 0 RRU's. Up to 14 bits are available to describe YPOS values between 0 and 12,292 RRU's (17 inches).

The LSB of the YPOS corresponds with the LSB of the input word. This code nominally follows the segment number, and is only issued once within a line segment.

(XPOS)="XPOS"

This is the X coordinate on the page in RRU's of the left side bearing of the character or of the reverse video coordinate that pairs with the YPOS RV coordinate. The left hand edge of the sheet of paper and the page is defined as 0. Normal margin offsets are controlled by Input System programs. Up to 14 bits are available to describe XPOS values between 0 and 7 and 7,954 RRU's (11 inches). The LSB of XPOS corresponds with the LSB of the input word.

TABLE 3

| | | | | | 16 BIT INPUT CODE FORMAT | | | | | | | | | |
|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 |
| SEG# | | | | | | | | | | | | | | |
| 0 | 0 | YLOW data in RRU's | | | | | | | | | | | | |
| 0 | 1 | YPOS data in RRU's | | | | | | | | | | | | |

TABLE 3-continued

| | | | | | 16 BIT INPUT CODE FORMAT | | | | | | | | | |
|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 |
| 1 | 0 | XPOS data in RRU's | | | | | | | | | | | | |
| 1 | 1 | 0 | 0 | 0 | 0 | CHAR number | | | | | | | | |
| 1 | 1 | 0 | 0 | 0 | 1 | FONT number | | | | | | | | |
| 1 | 1 | 0 | 0 | 1 | 0 | PT SIZE in ½ pts | | | | | | | | |
| 1 | 1 | 0 | 0 | 1 | 1 | SETWIDTH in ±⅛ pts | | | | | | | | |
| 1 | 1 | 0 | 1 | 0 | 0 | LR CODE | | | | | | | | |
| 1 | 1 | 0 | 1 | 0 | 1 | SLANT | | | | | | | | |
| 1 | 1 | 0 | 1 | 1 | 0 | RV CODE | | | | | | | | |
| 1 | 1 | 0 | 1 | 1 | 1 | END SEG | | | | | | | | |
| 1 | 1 | 1 | 0 | 0 | 0 | END PAGE | | | | | | | | |

(YLOW)="YLOW"

This is the Y coordinate on the page in RRU's of the bottom of the extended em square of the characters in the line segment. It is not necessary that this value be supplied for line segments with average characters; i.e., characters that fall within the extended em square. It must be supplied for logo's that do extend lower than the extended em.

The Input System derives the value from the font data and the point size that the logo is being set at. If this code is issued more than once, the highest value (lowest point on page) is retained by the Output Data Processing System. Scaling, zero placement, and data placement are identical to YPOS.

(FONT)="FONT"

This terminal code defines the font number to be used for all characters following until a new font is input. Up to 10 bits are available to input font numbers between 1 and 254 inclusive. The font number LSB corresponds to the word LSB.

(CHAR)="CHAR"

This terminal code defines the character number to be output and is a semi-terminating code (see the description in section 4.2.1.1). Up to 10 bits are available to input character numbers between 0 and 255 inclusive. The character number LSB corresponds to the work LSB.

(PT SIZE)="PT SIZE"

This terminal code defines the point size to be used for all characters in the line segment. It may only be issued once within a line segment. Up to 10 bits are available to input all half point sizes between ½ and 130 inclusive. The word LSB corresponds to ½ point, and bits 1 thru 8 defines the binary value of the point size directly.

(SET WIDTH)="SET WIDTH"

This terminal code defines the set width to be used for all characters following until a new set width is input. If this code is not issued, the set width has a default value equal to the point size of the line segment being set. The set width command(s) must follow the point size commands.

(LR CODE)="LR CODE"

This terminal code defines that the immediately following 2 words represent the YEND and XEND respectively in a line rule set in which YPOS and XPOS preceding are the beginning coordinates. The 10 LSB's of the input code are zero.

(SLANT)="SLANT"

This terminal code defines the slant amount to be used for all characters following in the line segment until a new slant is input. Up to 10 bits are available to define 5 possible slant conditions; value 0 corresponds to SLANT OFF, value 1 to SLANT +7, value 2 to SLANT +14, value 3 to SLANT −7, and value 4 to SLANT −14.

(RV CODE)="RV CODE"

This terminal code defines that the immediately following 2 words represent the YEND and XEND respectively in a reverse video set in which YPOS and XPOS preceding are the beginning coordinates. The 10 LSB's of the input code are zero.

(YEND)="YEND"

(XEND)="XEND"

These terminal codes define the bottom coordinates on the page of a reverse video set in the same scale as YPOS and YPOS. The two MSB are set to zero. If the YEND input has a value higher than the current YLOW, this value is used to redefine YLOW.

"END SEG"

This terminal code defines the end of a line segment, and sets all variable functions contained within that segment to the default value. The 10 LSB's are all zero.

"END PAGE"

This terminal code defines the end of a page, and sets all variable functions to the default value. The 10 LSB's are all zero.

This code must be provided by a line segment which contains a YLOW value equal to the depth of the page. This may be done by either:

(1) Defining a YLOW equal to the page depth within the last line segment of the page; or (2) Defining an additional line segment with the content:

(SEG#)(YPOS)(YLOW) "END SEG", where YPOS and YLOW equal the page depth, or with the content:

(SEG#)(YPOS)"END SEG", where YPOS equals the page depth.

FONT DATA

Font Data Structure

Coded data which describes the outlines of characters in a font will be transmitted from the Input System to the Output Data Processing System on a whole font basis:

(FONT)={(CHAR OUTLINE DATA)}"END FONT"

Each font consists of one set of character outline data for each character contained in the font. Up to 256 characters may be contained in the font, provided that the total contained in one font is less than 15,328 bytes by twice the total number of outlines in the font. The end font code is a terminating code, and no data relating to the font can be accepted after this code.

Each character's outline data is:

(CHAR OUTLINE DATA)=(CHAR)(#OUTLINES){(OUTLINE)}, where the outline non-terminal is used once for each outline defined by the #OUTLINES terminal.

The character number is identical to the CHAR terminal described in section and is a number between 0 and 255 inclusive. The number of outlines per character is limited to 255.

Each outline consists of start coordinates, vectors and controls as required to describe one edge of the character:

(OUTLINE)=(YN)(XN){(VECTORS)/(CONTROLS)}, where the permissible controls are:

(CONTROLS)=(END OUTLINE)/(CHANGE DIRECTION)(NO VECTORS)/(LONG VERTICAL)/(SHALLOW HORIZONTAL)

The above describes in specific detail the outline data structure syntactically covered in the two statements above. Reference should be made to this section; it is this data that should be transferred exactly from the floppy disk storage medium to the Output Data Processing System by the Input System for these two statements.

Table 4 summarizes the syntax of the font data structure:

TABLE 4

| FONT DATA SYNTAX |
|---|
| (FONT) = {(CHAR OUTLINE DATA)} "END FONT" |
| (CHAR OUTLINE DATA) = (CHAR) (# OUTLINES) {(OUTLINE)} |
| (OUTLINE = (YN) (XN) {(VECTORS)/(CONTROLS)} |
| (CONTROLS) = (END OUTLINE)/(CHANGE DIR)/(NO VECTORS)/ (LONG VERTICAL)/(SHALLOW HORIZONTAL) |

4.3.2 Input Codes/Terminal Elements

Figure 13:
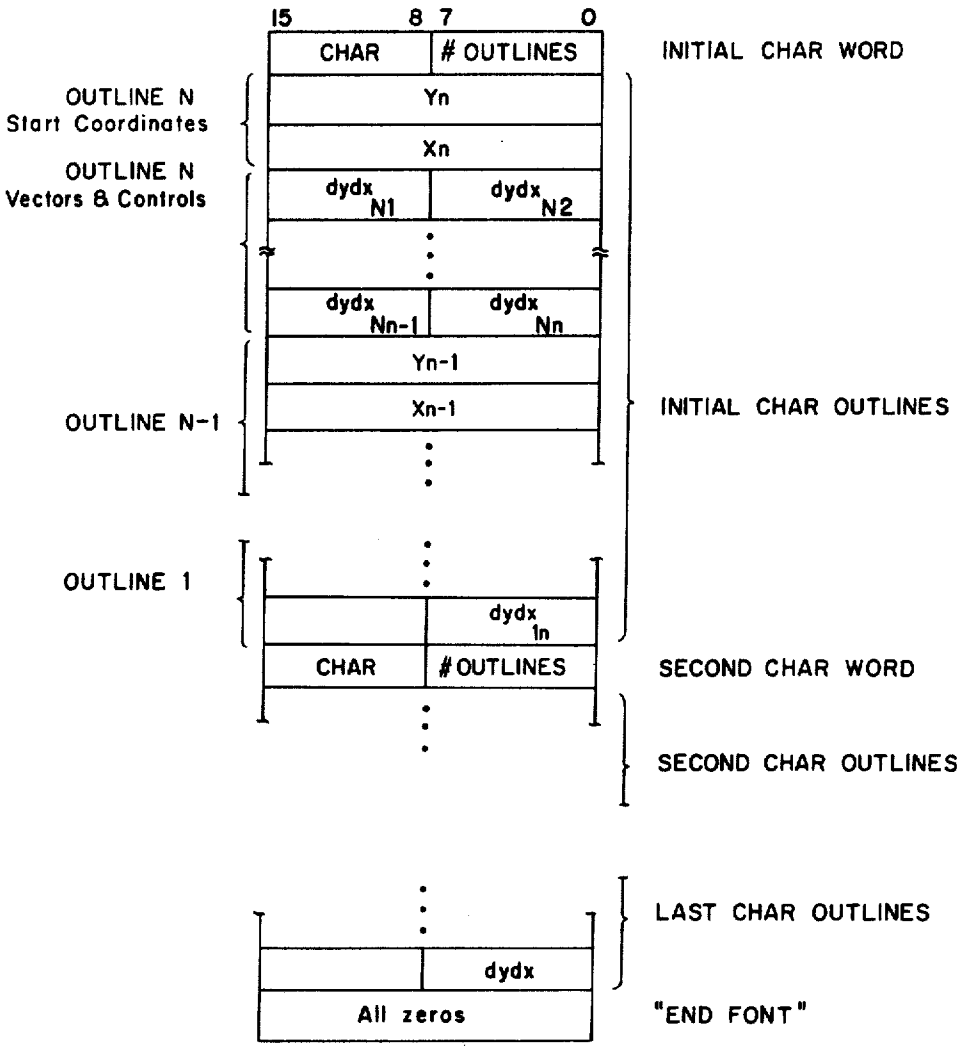
FIG. 13 is a diagram showing the input code structure for those terminal elements which are to be sent from the Input System for a font data transfer.

FIG. 13 summarizes the input code structure for those terminal elements which are to be sent from the Input System for a font data transfer.

4.3.2.1(CHAR)="CHAR"

This terminal code defines the character number assigned by the Input System. Up to 8 bits are available to describe character numbers between 0 and 255 inclusive. Bit 15 corresponds to the MSB and bit 8 is the LSB.

(#OUTLINES)="#OUTLINES"

This terminal code defines the number of outlines in this character and originates on the font floppy disk. Up to 8 bits are available to describe between 1 and 255 outlines.

"END FONT"

This terminal code is the font transfer terminating code. All 16 bits in the word are zeros.

DATA RAM

General

The data RAM serves as an output buffer for the DMS, and an input buffer for the OCS. As line segment data is input to the DMS, it is reformatted and stored into the data RAM. Two such data RAMs are used within the system, each one is 32 K bytes long. Both data RAMs are accessible by the DMS and the OCS with the following limitations:

(1) A processor may select and operate on only one data RAM at a time.

(2) A processor may not select a data RAM which is selected by the alternate processor.

(3) Once a processor deselects a data RAM (or releases control of it), any data within that RAM is no longer valid to that processor.

Data RAM Building

Figure 14:
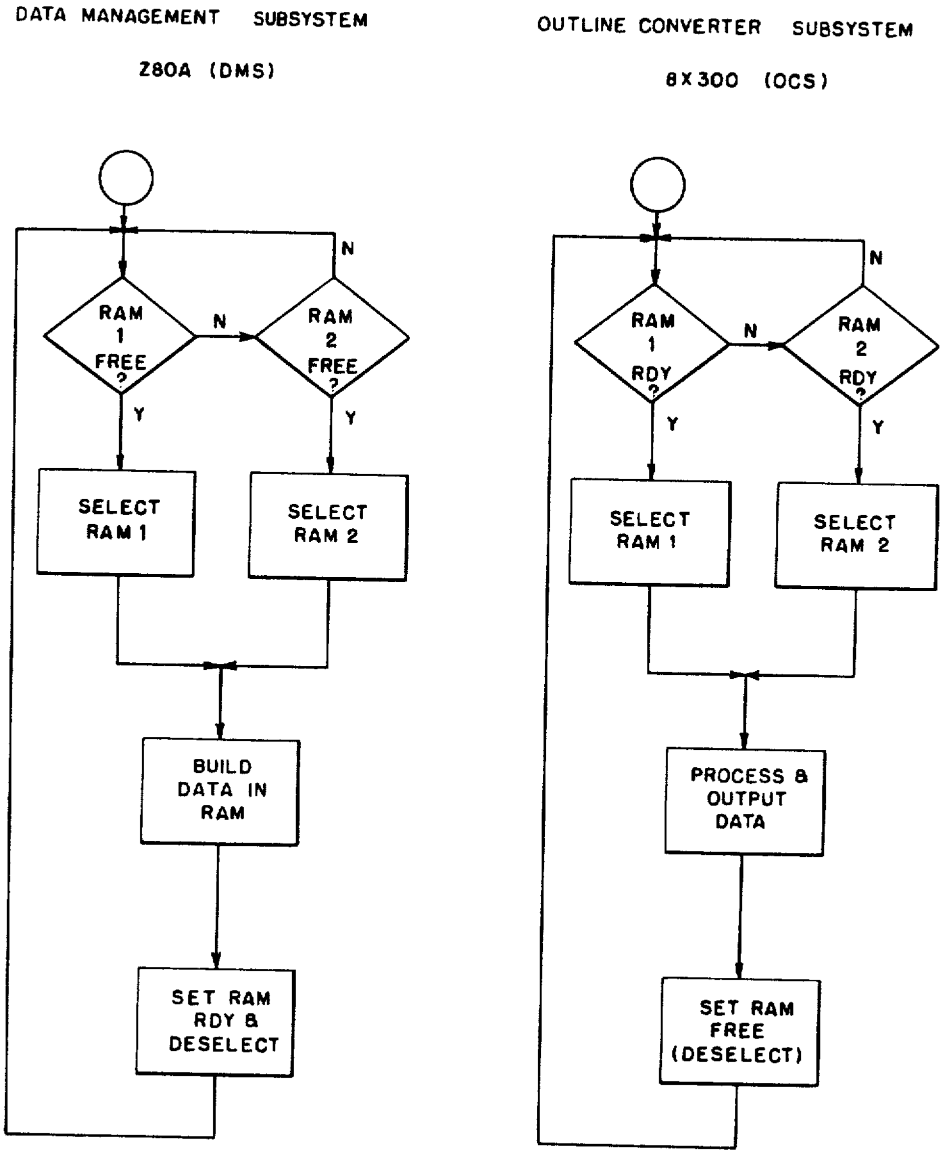
FIG. 14 contains flow diagrams showing the basic operation of the Data Management Subsystem and the Outline Converter Subsystem.

The data RAMs are developed by the DMS and passed onto the OCS for processing. Double buffering is used in building up the data and therefore two such RAMS exist. This permits the DMS to develop the next buffer of data while the OCS is processing the other. The basic design is shown in FIG. 14. In developing this data RAM, the DMS attempts to fill it with as much data as possible. By so doing, it should provide the OCS with enough data to work with to avoid the possibility of phototype setting unit (PTU) slow down.

The buffer space is optimized by sharing outline data that has been put into the buffer for other line segments. In order to achieve this, the DMS develops the RAM from two directions. Line segment data, as it is read in and reformatted, is put at the low end of memory, and related character outline data is put at the high end.

Figure 15:
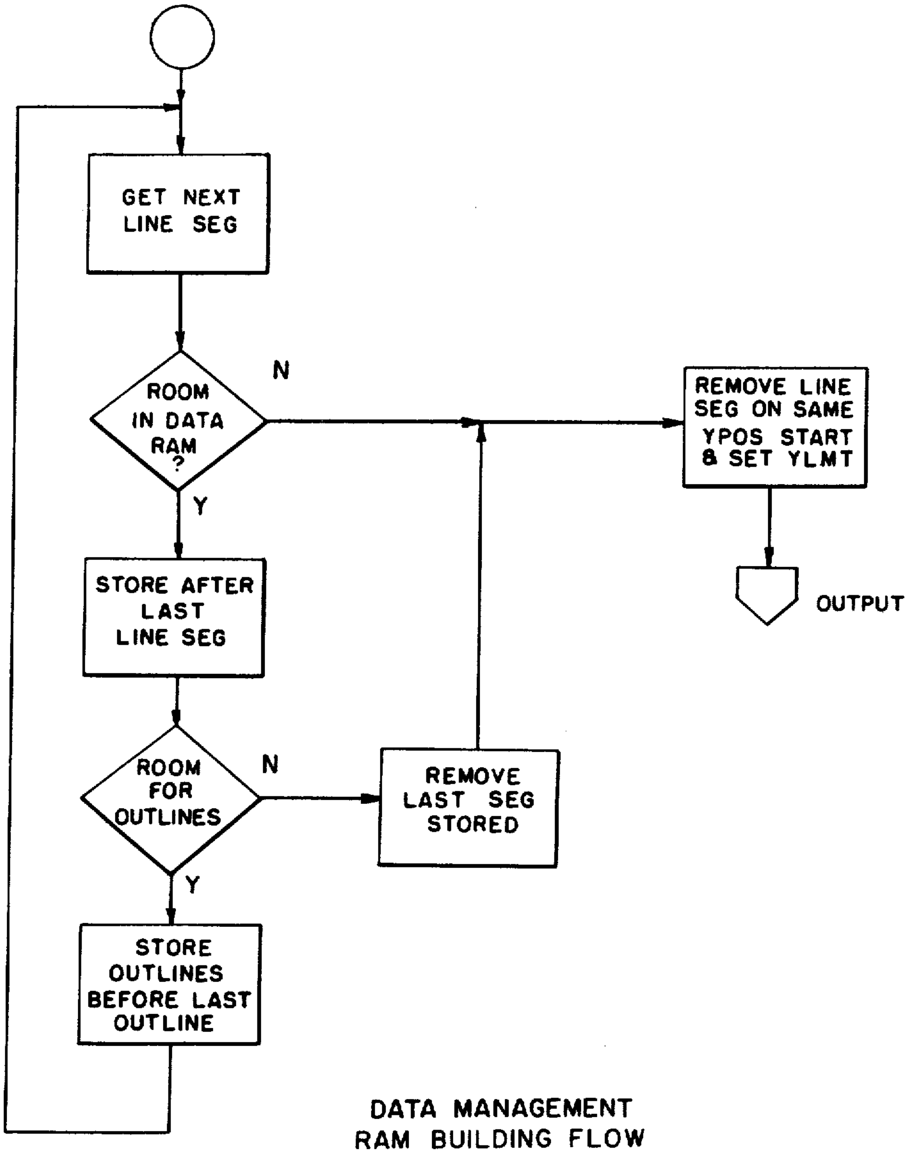
FIG. 15 is a flow diagram for the building of data in the Data RAM in the Data Management Subsystem.

When these two data sets interfere with each other, the data is backed up to the last complete line segment and the output limit is defined. This process is shown in FIG. 15.

Data RAM Format

Figure 16:
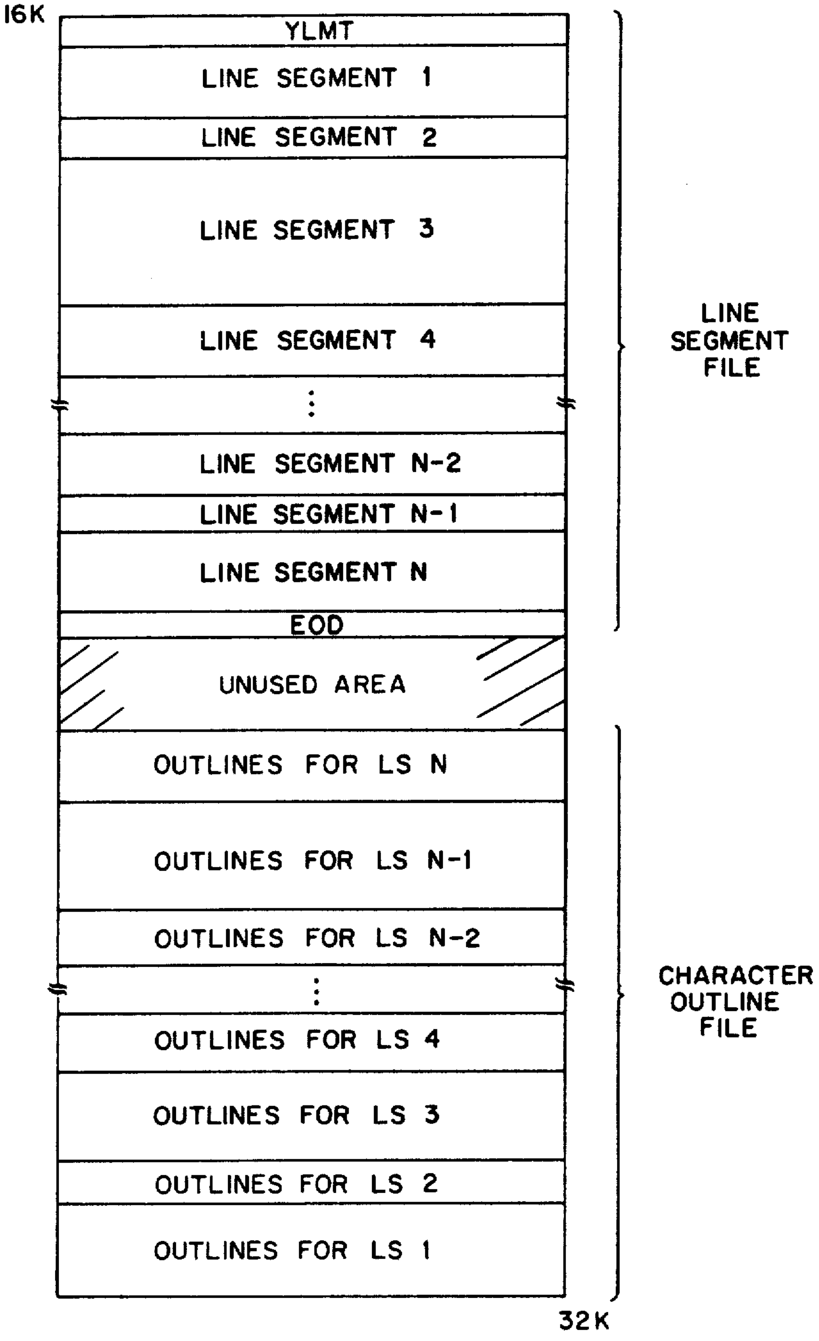
FIG. 16 is a diagram of the layout of data in the Data RAM.
Figure 17:
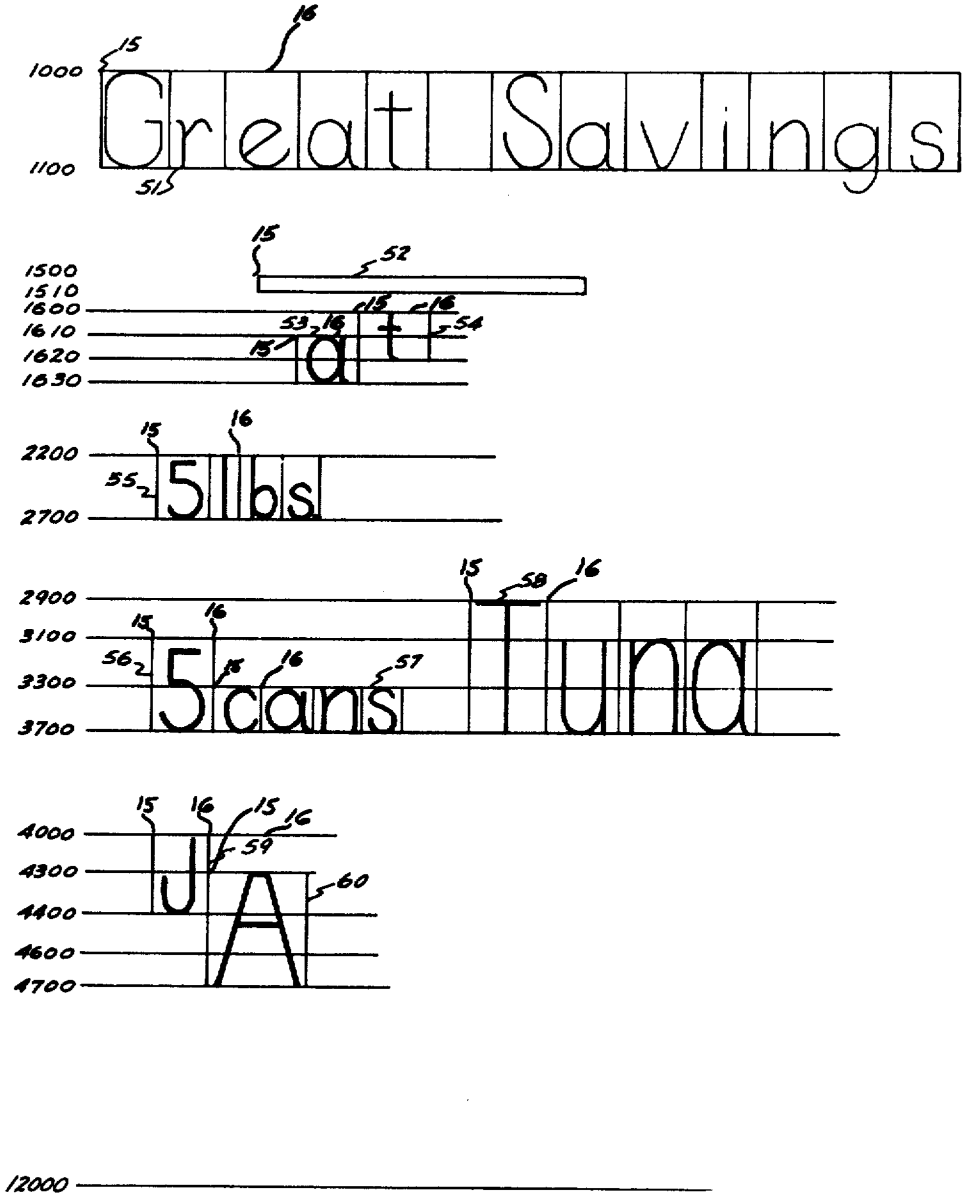
FIG. 17 is another arrangement of character data on a raster display and according to the input sequence.

The data RAM layout is illustrated in FIG. 16. The Character Outline section of the data RAM is shown in FIG. 17. In defining the format of the data RAM, the Meta-Language notation, as outlined in section 4.1.4, will be used. The Page, Line Segment File and Outline File structure are indicated in Tables 5, 6 and 7, respectively.

Page Structure: The OCS defines a page as one or more data RAMS:

[PAGE]=[INITIAL DATA RAM]{[DATA RAM]}

All pages must begin with a initial data RAM whose format is:

[INITIAL DATA RAM]=[YLMT][NEW PAGE][PAGE SECTION]

All subsequent data RAMS for the same page have the format:

[DATA RAM]=[YLMT][PAGE SECTION]

The difference between the two being the new page element which is itself a terminal element:

[NEW PAGE]="new page"

All data RAMS must have as its first code, the output limit value:

[YLMT]="Y limit"

The data file can be divided into to separate files, the line segment file and the character outline file:

[PAGE SECTION]=[LINE SEG FILE][OUTLINE FILE]

Line Segment File

The Line Segment File consists of all the line segments input and reformatted by the DMS. This has the form of:

[LINE SEG FILE]={[LINE SEG]}[END RAM]

As many line segments as there is room for may be put into this file. The last line "segment" must be followed by the end RAM code:

[END RAM]=[END DATA]/[END PAGE]

If more data exists for the page, the end data element is used. If this is the last RAM for the page, the end page element is used.

The line segment may be defined as follows:

[LINE SEG]=[START SEG]{[CHAR SET]/[RV SET]}

The structure is very similar to the input format, however, the code structure does vary.

All line segments must start with a start segment element. This is defined as:

[START SET]=[Y SET]/[SEG LINK PAIR]/[YACC PAIR]

YSET can be defined as:

[YSET]=[YPOS][ZERO DATA WORD]

and is always inserted at the start of every line segment by the DMS. This defines the Y coordinate of the page where the line segment is to be processed. The ZERO DATA WORD serves as a two byte pad for use when the line segment becomes active (i.e. processing of outlines begin) or deleted.

Once processing of a line segment starts, YSET is replaced by the YACC PAIR, where:

[YACC PAIR]=[YACC HIGH][YACC LOW]

The YACC PAIR is the next set level in DRU's for the line segment. After the OCS has completely processed a line segment, it replaces it with the link pair.

[SEG LINK PAIR]=[LINK HIGH][LINK LOW]

This link pair is two elements which combined provide an absolute address of the next line segment.

Character Set

All character sets within a line segment must follow the structure:

[CHAR SET]=[INITIAL CHAR]{[CHAR PAIR]} with one initial character followed by one or more character pairs. The initial character must follow the structure:

[INITIAL CHAR]=[ΔYS PAIR][SCALE PAIR][XPOS][CHAR PAIR]

The ΔYS pair defines the change in DRU's per raster resolution unit. It is dependent on the point size.

[ΔYS PAIR]=[ΔYS HIGH][ΔYS LOW]

The scale pair defines the number of raster resolution units for each DRU. It is dependent on the set width.

[SCALE PAIR]=[SCALE HIGH][SCALE LOW]

A character pair is defined as:

[CHAR PAIR]={[FUNCTION]}[OUTLINE ADD]

and where permissible functions are:

[FUNCTION]=[XPOS]/[SCALE PAIR]/[SLANT OFF]/[SLANT+7]/[SLANT−7]/[SLANT+14]/[SLANT−14]/[BLJ]/[NULL]

All functions received prior to the outline address are carried over and remain valid until altered by a new function code or a new line segment.

Reverse Video Set

The reverse video structure is:

[RV SET]=[XPOS][RVY PAIR][RVX PAIR]

and:

[RVY PAIR]=[RVY HIGH][RVY LOW]

[RVX PAIR]=[RVX HIGH][RVX LOW]

5.3.3 Outline File

The Outline File has the basic structure:

[OUTLINE FILE]={[CURVE UPDATE FILE]/[CHAR OUTLINE]}

The character outline file is the font RAM data for the particular character reformatted by the DMS into the following format:

[CHAR OUTLINE]=[CURVE UPDATE FILE][SLOPE FILE]

The curve update file is the start for every curve in the character

[CURVE UPDATE FILE]={[OUTLINE STARTS]}

[OUTLINE STARTS]=[YN][XN][SLOPE ADD]

The signs in XN word in the outline file have been complemented by the DMS if wrong reading is in effect.

As the OCS processes outlines, the OUTLINE STARTS data are updated to reflect the current processing point within each outline.

The slope file is:

[SLOPE FILE]={[VECTORS]/[CONTROLS]}

The controls are defined in the foregoing.

TABLE 5

| PAGE STRUCTURE |
|---|
| [PAGE] = [INITIAL DATA RAM] {[DATA RAM]} |
| [INITIAL DATA RAM] = YLMT] [NEW PAGE] [PAGE SECTION] |
| [DATA RAM] = [YLMT] [PAGE SECTION] |
| [PAGE SECTION] = [LINE SEG FILE] [OUTLINE FILE] |
| [LINE SEG FILE] = {[LINE SEG] [END RAM]} |
| [END RAM] = [END DATA]/[END PAGE] |

TABLE 6

| LINE SEGMENT FILE STRUCTURE |
|---|
| [LINE SEG] = [SEG START] {[CHAR SET]/[RV SET]} |
| [SEG START] = [YSET PAIR]/[LINK PAIR]/[YACC PAIR] |
| [YSET PAIR] = [YPOS] [ZERO DATA WORD] |
| [LINK PAIR] = [LINK HIGH] [LINK LOW] |
| [YACC PAIR] = [YACC HIGH] [YACC LOW] |
| [CHAR SET] = [INITIAL CHAR] {[CHAR PAIR]} |
| [INITIAL CHAR] = [ΔYS PAIR] [SCALE PAIR] [XPOS] [CHAR PAIR] |
| [ΔYS PAIR] = [ΔYS HIGH] [ΔYS LOW] |
| [SCALE PAIR] = [SCALE HIGH] [SCALE LOW] |
| [CHAR PAIR] = {[FUNCTION]} [OUTLINE ADDRESS] |
| [FUNCTION] = XPOS]/[SCALE PAIR]/[SLANT OFF]/[SLANT + 7]/ [SLANT − 7]/[SLANT + 14]/[SLANT − 14]/[BLJ]/[NULL] |
| [RV SET] = [XPOS] [RVY PAIR] [RVX PAIR] |
| [RVY PAIR] = [RVX HIGH] [RVY LOW] |
| [RVX PAIR] = [RVX HIGH] [RVX LOW] |

TABLE 7

| OUTLINE FILE STRUCTURE | |
|---|---|
| [OUTLINE FILE] = | {[CURVE UPDATE FILE]/ [CHAR OUTLINE]} |
| [CHAR OUTLINE] = | [CURVE UPDATE FILE] [SLOPE FILE] |
| [CURVE UPDATE FILE] = | {[OUTLINE STARTS]} |
| [OUTLINE STARTS] = | [YN] [XN] [SLOPE ADD] |
| [SLOPE FILE] = | {[VECTORS]/[CONTROLS]} |

Terminal Elements

Table 8 summarizes all the coded entries in the data RAM entries. The uncoded elements, YLMT, YSACC, and outline elements, within a data RAM are not in the table: they are 16 bit binary values whose position defines the code type. The uncoded data RAM outline elements are as defined above the previously defined syntax must be followed.

[OUTLINE ADDRESS]="outline address"

This is a 14 bit number which specifies the address in the outline file of the character outline to process. The address always points to the first curve of the outline in the update file. This is a word address and must therefore be doubled to get the byte address within the 32 K RAM. (Since all data in the data RAM is 16 bit codes, codes will always start on an even byte address).

[YPOS]="YPOS"

This is the same code as entered into the DMS. See the foregoing for format and definition. In OCS, it shows an additional function. It not only marks the start of a new line segment, but also terminates the previous line segment.

[ZERO DATA WORD]="ZERO DATA WORD"

This uncoded 16 bit field always follows YPOS. It serves as a pad for use when a line segment becomes active.

[YACC HIGH]="YACC HIGH"

This code defines the most significant 8 bits of the set level in DRU's . It contains the 8 most significant integer bits of the value.

[YACC LOW]="YACC LOW"

This is a 16 bit field which always follows YACC HIGH. It contains the remaining 2 integer bits and the 11 decimal bits of the set level; the 3 least significant bits are always 0.

[XPOS]="XPOS"

This is the same code as entered into the DMS. (See the foregoing for format and definition), except when the wrong reading switch is set, when the page width complement of XPOS (PG WDTH-XPOS) is entered.

[NULL]="NULL"

The null code is used to delete elements within a line segment. The DMS inserts this code to remove font calls within a segment as they are acted on. The OCS inserts this code to remove "outline address" as they are completed.

TABLE 8

| 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|
| 0 | 0 | | Character Outline Address | | | | | | | | | | | |
| 0 | 1 | | YPOS data in RRU's | | | | | | | | | | | |
| 1 | 0 | | XPOS data in RRU's | | | | | | | | | | | |
| 1 | 1 | 0 | 0 | 0 | 0 | 0 | 0 | Null | | | | | | |
| 1 | 1 | 0 | 0 | 0 | 0 | 0 | 1 | ΔYs High | | | | | | |
| 1 | 1 | 0 | 0 | 0 | 0 | 1 | 0 | ΔYs Low | | | | | | |
| 1 | 1 | 0 | 0 | 0 | 0 | 1 | 1 | Scale High | | | | | | |
| 1 | 1 | 0 | 0 | 0 | 1 | 0 | 0 | Scale Low | | | | | | |
| 1 | 1 | 0 | 0 | 0 | 1 | 0 | 1 | BLJ | | | | | | |
| 1 | 1 | 0 | 0 | 0 | 1 | 1 | 0 | Link High | | | | | | |
| 1 | 1 | 0 | 0 | 0 | 1 | 1 | 1 | Link Low | | | | | | |
| 1 | 1 | 0 | 0 | 1 | 0 | 0 | 0 | RVY High | | | | | | |
| 1 | 1 | 0 | 0 | 1 | 0 | 0 | 1 | RVY Low | | | | | | |
| 1 | 1 | 0 | 0 | 1 | 0 | 1 | 0 | RVX High | | | | | | |
| 1 | 1 | 0 | 0 | 1 | 0 | 1 | 1 | RVX Low | | | | | | |
| 1 | 1 | 0 | 0 | 1 | 1 | 0 | 0 | New Page | | | | | | |
| 1 | 1 | 0 | 0 | 1 | 1 | 0 | 1 | Slant Off | | | | | | |
| 1 | 1 | 0 | 0 | 1 | 1 | 1 | 0 | Slant +7 | | | | | | |
| 1 | 1 | 0 | 0 | 1 | 1 | 1 | 1 | Slant −7 | | | | | | |
| 1 | 1 | 0 | 1 | 0 | 0 | 0 | 0 | Slant +14 | | | | | | |
| 1 | 1 | 0 | 1 | 0 | 0 | 0 | 1 | Slant −14 | | | | | | |
| 1 | 1 | 0 | 1 | 0 | 0 | 1 | 0 | End of Data | | | | | | |
| 1 | 1 | 0 | 1 | 0 | 0 | 1 | 1 | End of Page | | | | | | |
| 1 | 1 | 0 | 1 | 0 | 1 | 0 | 0 | YACC High | | | | | | |
| 1 | 1 | 0 | 1 | 0 | 1 | 0 | 1 | Font Call | | | | | | |

[ΔYs HIGH]="ΔYs HIGH"

This contains the most significant 8 bit of the computation 43.2/POINT SIZE. It consists of a 5 bit integer number and 3 bit decimal.

[ΔYs LOW]="ΔYs LOW"

This contains the remaining 8 bit decimal value of the computation 43.2/POINT SIZE. This code will always follow Ys high.

[SCALE HIGH]="scale high"

This contains the most significant 8 bits of the computation set width/43.2. It consists of a 4 bit integer number and 4 bit decimal.

[SCALE LOW]="scale low"

This contains the remaining 8 bit decimal value of the computation set width/43.2. This code will always follow "scale high".

[BLJ]="BLJ"

The code defines the baseline adjustment in 154ths.

[LINK HIGH]="link high"

This code supplies the most significant 8 bits of a link address used to skip over line segment(s) that have been completed.

[LINK LOW]="link low"

This code supplies the least significant 8 bits of a link address used to skip over line segment(s). This code will always follow the "link high" code.

[RVY HIGH]="RVY high"

[RVY LOW]="RVY low"

[RVX HIGH]="RVX high"

[RVX LOW]="RVX low"

These codes must be in the above sequence. The lower order 8 bits defines the reverse video limits.

[NEW PAGE]="New Page"

This control defines a data RAM as the first of a new page. It must be issued before the first line segment of a page.

Bit 0 is a 0 for normal, standard operating mode and is a 1 for proof page mode. Bit 1 is a 0 for normal resolution units (1/10 pt. per raster) and is a 1 for high resolution units (1/20 pt. per raster). The other 6 LSB's have no meaning.

[SLANT OFF]="Slant off"

[SLANT+7]="Slant+7"

[SLANT−7]="Slant−7"

[SLANT+14]="Slant+14"

[SLANT−14]="Slant−14"

These codes define which slant constant is to be used for the following outline computation. The LSBs have no meaning.

[END DATA]="End data"

This code follows the last line segment within the data RAM. It informs the OCS that more data for this page will follow in the next data RAM. The LSBs have no meaning.

[END PAGE]="End page"

This code follows the last line segment of the page. It informs the OCS that no more data RAMs for the page follow. The LSBs have no meaning.

[YLMT]="Y limit"

This terminal is the first code in the data RAM. It is a 14 bit number defining the last raster in RRUS that shall be output by the OCS with the data in the data RAM.

"Font Call"

This code is generated by the Z80A to simplify font call processing. It is a temporary code which is replaced with a NULL Code prior to releasing the DATA RAM to the OCS for output processing.

The hardware processor for converting the character data to character intersection points is disclosed in the aforementioned application Ser. No. 950,242, filed Oct. 10, 1978.

This invention is described with reference to FIGS. 17–21, wherein a method and system are shown for rearranging the input order or any order of character data in the same relative order as the generated raster lines. The raster line order shown is in ascending order. Ascending order is a convention where the first raster line is given a value 1 and with successively generated raster lines given progressively higher values.

However, this is a convention chosen to explain the invention and it should be understood that the convention may be changed with the principles of the invention remaining the same.

A sample text copy is shown in FIG. 17.

Figure 18:
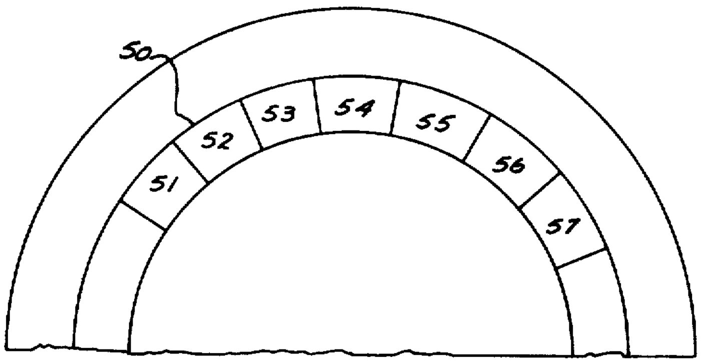
FIG. 18 shows the arrangement of the data of FIG. 17 on a storage medium.

If the character data corresponding to this copy was to be entered into the input system 1 in the order it was generated, and assuming all data can be entered into one sector of a disc, the data may be physically located in blocks as shown in FIG. 18 starting with block 51 at the beginning of sector 50. Block 51 contains the information for "Great Savings". The composer would enter the information typically from the top to the bottom of the page starting with the characters closest to the left side and working toward the right hand characters on the same line. The composer would then go down the page adding information next highest in ascending order value and closest to the left side of the page. That would be for the line rule 52, then "a" of the word "at" represented by the block 53. The composer would then enter the "t" of the word "at" would be represented by block 54.

Following a conventional composing order, the composer would enter the information having the next highest value in the ascending order of the raster lines, and being closest to the left side. That would be the "5" in "5 lbs". represented by block 55, followed by the short hand for "lbs." also located in block 55.

The composer would then add the information, having the next highest ascending order value and located closest to the side which would be "5" of block 56 followed by by the word "cans" of block 57 and the word "tuna" of block 58.

In FIG. 17 for the sake of explanation, the EM square outlines for the characters in each block are shown, so that character size changes may be easily recognized and the line segments may be referred to with the same numerals as their respective data blocks in FIG. 18.

Reviewing FIG. 17, it can be that "Great Savings" occurs between raster lines 1,000 and 1,100. Where the raster lines may be equal to a tenth of a point, "Great Savings" is in 10 point size type.

The composer has followed "Great Savings" with a line rule function being 1 point in width, between raster lines 1500 to 1510.

Next the composer added the word "at" where the characters are the same size as shown by the size EM square but with a base line jump between "a" and the "t". The base line for "a" being 1630 and the base line for "t" being 1620. The composer then followed that with the word "5 lbs." between raster lines 2200 and 2700, representing 50 point size. Finally, the copy ends with the legend "5 cans tuna" with the "5" being a 60 point character, followed by "cans" between raster lines 3300 and 3700, being in 40 point followed by "Tuna" between raster lines 2900 and 3700 being in 80 point characters.

The data within each of the blocks 51 through 57 are physically in sector 50 on the floppy disc of FIG. 18, and each block comprises a series of 8 bit bytes which designate the identity, size, and location of the characters. The block data may overflow a sector and straddle two sectors.

Figure 19:
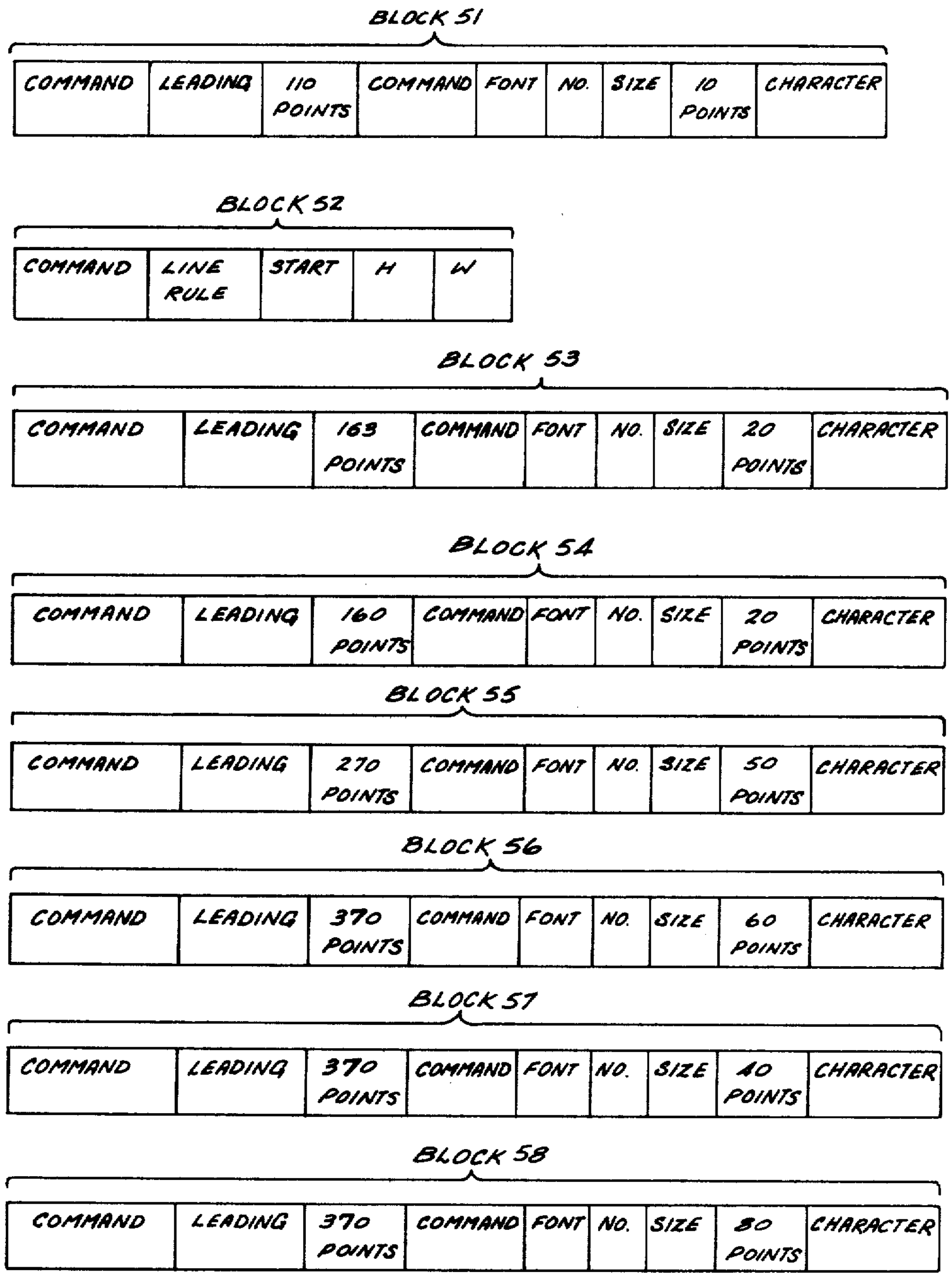
FIG. 19 is a block diagram of the data of FIG. 18.

As shown in FIG. 19 starting with block 51, an 8 bit byte designates a command identifier, followed by an 8 bit byte for a leading or base line instruction, followed by the point location of the base line for "Great Savings", the base line being located on raster line 1100. With one-tenth of a raster line being equal to a point, the base is located 110 points from the top of the page.

To complete the instructions for block 51, a command byte identifier proceeds a font instruction, followed by a font designation followed by a size instruction followed by character size.

As shown in FIG. 17, the location of each character is referenced to a raster line intersecting the top 16 of the character EM square and passing through the upper left hand corner 15 of the EM square, (See FIG. 2).

Block 51 is completed by data for each of the characters "G" through "S".

Next, in the input sequence is the line rule in block 52. It contains a command identifier byte followed by a line rule instruction, followed by bytes designating the start point and the height and width of the line rule.

Next in the input sequence, block 53 contains the data for "a" and is initialized with a command identifier followed by a leading command for a new base line, followed by the location of the new base line in point size, new base line appearing at raster line 1630 and 163 points from the top of the page.

Block 53 further contains the data corresponding to the font number and size of the characters. As this data block is completed by next inserting a command identifier followed by a font and size instruction, followed by a series of bytes indicating characters. In this case, the respective EM square is between raster line 1610 and 1630 for a size of 20.

As the t in "at" is located on a different base line, corresponding to raster line 1620, the composer will issue a new command, changing the base line and does so within block 54 by first inserting a command identifier followed by a leading instruction and next indicating the position of the new base line 162 points from the top of the page. Additional data for block 54 may be font and point size instructions. In this case, the size is the same for the "a". The last data bytes would be for the character.

The next entered information would be in block 55 corresponding to "5 lbs.", and would be represented by data bytes for a command identifier as in the previous cases followed by a leading instruction followed by a command identifier followed by font and size instruction. In this case, the characters in block 55 are located on a base line of 2700, 270 points from the top of the page and the point size is 500. The last series of bytes would be for the characters.

Data block 56, representing the "5" of "5 cans tuna" would be preceded by a command identifier followed by a leading instruction followed by the base line location 370 points from the top of the page. The font size information would then be preceded by a command identifier followed by a respective font and size instruction followed by the character data.

Block 57 for "cans" would again be preceded by a command instruction followed by command identifier followed by font number and character size instructions followed by the character data. A leading instruction is shown but not necessary no base line change is between "5" and "cans".

The word "Tuna", although on the same base line, represents a point size change. Block 58 for "Tuna" must include a command identifier, preceding the font designation and character size instructions and is followed by the character data.

For "Tuna" the size is 80 point.

As described in the preceding, size, location and font data are placed on the disc, as shown by blocks 51 through 57, and the text is loaded into the Output Data System (ODS) Data Ram.

However, as explained in reference to FIG. 17, if this data is accessed from the data ram in a predetermined sequence which may be the data input sequence, as placed in the system by the composer, then data block 51 will be accessed at the appearance of a raster line where the characters represented by that data are to be imaged. This would be the occurrence of reference raster line 1000 intersecting the top and the upper left hand corner of the EM square for the first character "G" of line segment 51. As all characters in that sequence of block 51 are the same size, and represented by the same EM square size, the sequence of intersection data for all characters in "Great Savings" from raster line 1000 through 1100 will be outputted in step with the raster lines as generated and in ascending order.

The next character is the line rule between raster lines 1500 and 1510, which has a different identification scheme as explained further in the description. Block 52 is accessed at the occurrence of raster lines 1500.

Following the character data input sequence, at the occurrence of raster 1610, the output data system will start identifying the intersections of the raster line boundaries with the character "a" of line segment 53 and for the intersections of raster line 1610 and successive raster lines with the character "t". However, the intersections for the character "t" will only be identified, starting with raster line 1610, assuming line segment block 53 is accessed according to the composer's input order. It is then accessed subsequent to the accessing of block 52. At that point, when the output data system and display system is at raster line 1610 and past those raster lines 1600 to 1610, intersecting the top portion of the "t" the top portion of the "t" is lost, unless the raster line generator reverse direction.

If the character data is loaded into the Data Ram of FIG. 16, in the input sequence, and that data is used to computer intersection points in the same order, data for the "t" would not be available until after the ODS started accessing data for the "a" thereby causing a top portion of the "t" lines 1600 to 1610 to be omitted from the imaging of the characters.

The next sequence of information is block 55 for "5 lbs." all of the same point size and base line location.

Blocks 56–58 contain the data for the "5 cans Tuna".

As can be seen for the different size characters of block 56, 57 and 58, a result similar to "at" would follow.

In this case, where the data from the input system stored in blocks 56 and 57 are loaded into the Data Ram and then accessed from the Ram in the same order, the data for "5" would first be accessed at the occurrence of the raster line 3100, corresponding to the top of the EM square for the "5".

Next accessed in sequence would be the data block 56 for the word "cans" which would have a smaller character size and accessed at raster line 3300 so no portions of "cans" would be lost.

However, the characters for the word "Tuna" are a larger point size, and would not be accessed until after the raster line progression had reached 3300 as block 57 is prior to block 58 according to the input sequence.

In this case, when the sequence of raster lines reaches 3300 corresponding to the top of the EM square of the line segment "cans", the portion of the characters of the word tuna occurring above the raster 3350, between raster line 2700 and 3350 would be lost.

This device avoids this result by resequencing the information in order of ascending raster lines, and by identifying common data in segments and by a suitable parameter which avoids such a loss of information.

For resequencing, successive characters having common parameters are identified as line segments and by a reference raster line intersecting the top of each line segments first character EM square.

In the segmenting scheme, all the character data placed into the input store by the composer are scanned for changes in those common parameters and which could produce a loss of information as explained above. These changes are a change of character size, base line and superior and inferior autofractions, the occasion of a line rule function, a reverse video function or a memory sector overflow. The data is then reorganized into segments comprising successive characters which can be identified by a commonality of a set of selected parameters.

In scanning the input data as originally set into the system, and store 1 of FIG. 1, segments are identified at the occurrence of a first character, a base line change, character point size change, a line rule function, a reverse video function, a sector overflow as discussed in detail on pages 47–56.

Figure 20:
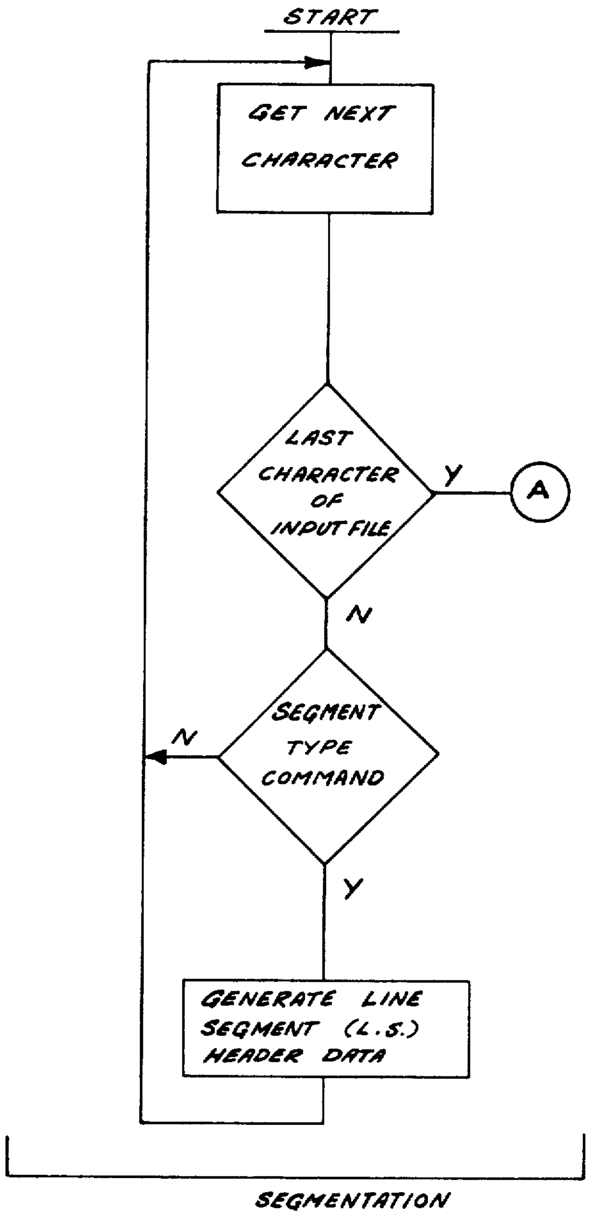
FIG. 20 shows the flow diagrams of the segmenting and reordering scheme.
Figure 20A:
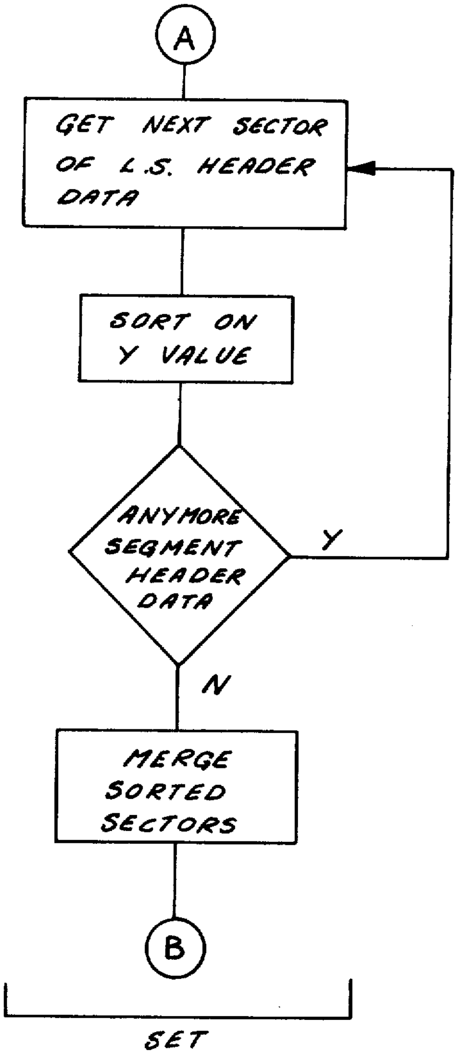
Figure 20B:
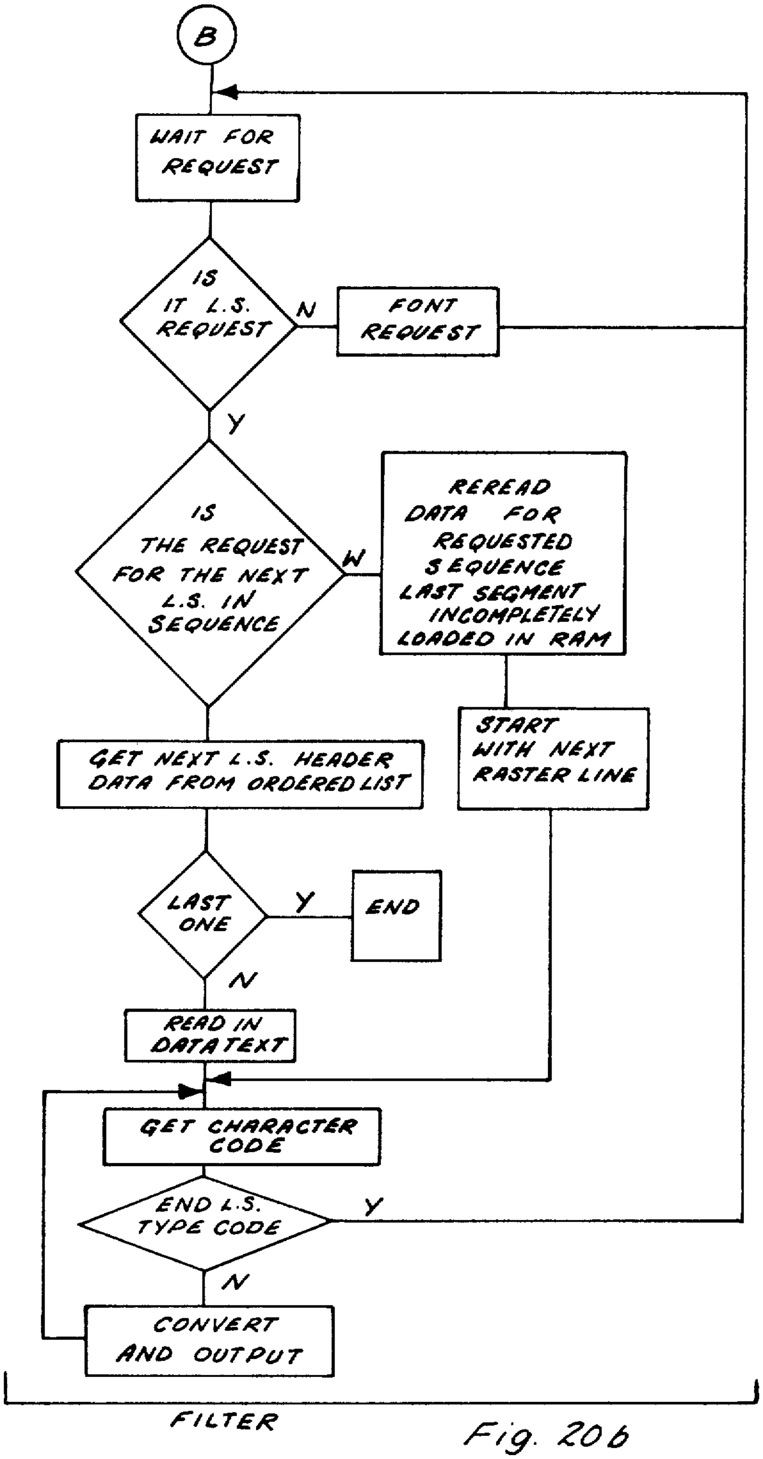
Figure 21:
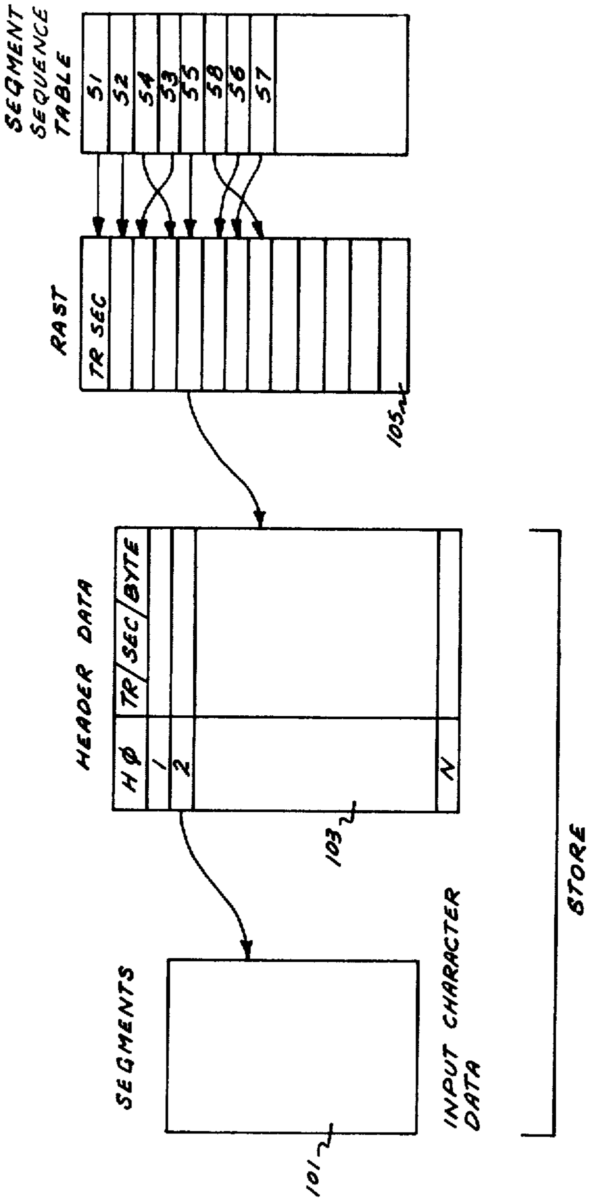
FIG. 21 shows the arrangement of the Header file and address file for accessing the segmented character data.

The segmenting scheme shown in the flow chart of FIG. 20 and in FIG. 21 starts with the inputted text character data of the first store and reorders it before transmittal to the ODS in a suitable condition.

The data must be reordered so that the information is placed in the ODS Data Rams in the order it is to be accessed for the computation of intersection points and is arranged in the same order as the ascending order of the raster lines.

This is accomplished by identifying the data in line segments and rearranging all of the line segments by each line segment's referenced raster line. In this way, regardless of where each line segment appears relative to another segment after the completing of the text, all segments will be reordered in the order of ascending raster lines. For convenience, the direction of the successively advancing raster lines is chosen as the Y direction and the direction in which each individual raster line is generated as chosen as the X direction. Each raster line will then have a Y value.

The line segments comprise successive characters located on the same base line or having the same character size or such successive characters unbroken by a line rule function or a sector overflow or a reverse video function.

The line rule and reverse video function are not referenced to an EM square and therefore, a display location referenced to a raster line must be provided for these functions and the line segment data in the header file.

In a sector overflow, character data for a line segment straddles two sectors on a disk file. It is then necessary to break the segment and provide new segment header information for the continuing segment data on the next successive sector to avoid the necessity for linking information.

The reordering function comprises a three pass operation. The first pass is segmentation and requires a scanning of the composed text in the first input store 101 and the building of a file identifying the start address and the data conditions of all the line segments. This file is stored in the Header file 103. The second task is the setting of the Header file sequence 103 into the described ascending order. The third task is the process of transmitting the text in the new rearranged order to the ODS Data Rams.

In actual use, the three tasks may be divided into two processes. The first pass is under control of a background level while pass 2 and 3 are processed separately and activated by pass 1.

As the object of the Reordering function is to arrange the segments by ascending Y value The Header file 103 should include all the machine parameters for the segment.

The Header file includes the Y coordinate and X coordinate of the upper left hand corner of the EM square of the first character in the segment, the point size, the font, the set width, the slant, and the flash data.

In this connection, flash data is used to note a spacing, for a character which is to be added later.

Referring to FIG. 21 and recognizing that to make most efficient use of the data space, the data store may randomly physically store the inputted character data in the physical configuration that offers the greatest utilization of space, the store then contains a series of address for locating that data spaced randomly in the store and the data sequence referred to would be the sequence of data accessed by the series of addresses.

The character data is initially stored on a storage medium such as a disk 101 and in the input or any other suitable data sequence. A Header data file 103 is then built by identifying strings of successive characters in file 101 as segments and identifying the address of these segments in file 101 by Track, Sector and byte location and by selected header data including segment display location data. The header file may be placed on the same first storage medium. A random access table (RAST) 105 stores the header file address in the first store. A sector sequence table 107 is then used to reorder the addressed order of file 105, in the ascending order of raster lines. The RAST 105 is then accessed in the order of the sector sequence table 107. The addresses in the RAST are then used to access the header file data 105.

The header file data is used to access and load the haracter into the ODS data Ram in the Filter routine FIG. 20.

The method of segmenting and reordering the character input data is now shown with reference to FIG. 20.

In the segmentation routine data from the input store 101 is loaded into a buffer memory and that buffer is scanned for the beginning of a segment.

A segment is first indicated by the recognition of the command identification code which indicates that either a point size change, base line change, line rule function or reverse video function may follow.

Where any of these conditions occur a segment is created at the occurrence of the next character and the header file 103 is loaded with the line segments address by track, sector and byte.

Segmentation Parameters

The segmentation parameters are the variables which are used to create the line segment header file 103 for each line segment created.

These consist of the following:

a. YCURR Bytes; the current y coordinate in raster units in microns (base) being set on. This is initialized to $\phi$, at the start of every page.

b. XCURR 2 Bytes; the current X coordinate in microns. This is initialized at the end of every line to $\phi$ and at the start of a page.

c. PTS 2 byte; the point size currently being set. Value is defined in ½ points. Initialized at the start of a page to $\phi$ and then updated when a new point size is issued.

d. SW 2 byte; defines the set width being used in ½ points. Set equal to the point size until a set width value is issued.

e. SLST 1 byte; defines the slant status 0—Slant off 1—Slant+7 2—Slant+12 3—Slant 7 4—Slant 12

This is initially set to $\phi$.

f. FLST—byte; defines the flash status. 0 indicates flash enable otherwise flash is off. This is initialized to 0 at the start of every page.

g. FONT—1 byte; defines the current font L Byte—SECTOR & SLANT 1 Byte—Font, 1 It is initialized to $\phi$ at the start of every page.

h. WRD—1 byte; defines the byte number within the current sector where the new segment starts. Initialized to $\phi$.

i. SECT—1 byte; points to the RAST entry of the sector in which the segment starts. Initialized to $\phi$.

Line Segment File

The line segment header file 103 is stored as a normal text file. Each entry into this file is 12 bytes and represents the start of a new line segment. The format of each entry is as follows:

2 Bytes—y coordinate in 1/10ths (of the segment reference raster line);

2 Bytes—X coordinate in 1/10ths

2 Byte—Font;

1 Byte—Point size in ½ points;

1 Byte—Set Width in ½ points;

1 Byte—TRACK & FLASH

1 Byte—Byte count that identifies the first byte in the sector of the line segment.

1 Byte—Track link

1 Byte—Sector Link

The last two bytes are used when a line segment overflows into another sector.

Referring back to FIG. 9 where it is shown in the typesetting art, all characters are referenced to respective size EM blocks.

A processor such as an 8080 made by the Intel Corporation and containing a suitable program recognizes the beginning of each line segment, and gives it a micron value corresponding to the level of the corresponding reference raster line.

In building the header file 103 the processor, through a suitable program determines the raster reference level of the EM block for the first character in a segment by subtracting the character point size from the base line value. It then converts the raster level in point size to a raster level in microns to obtain the segment Y value.

The processor also inserts the X coordinate for the character EM block.

The X coordinate is determined by using the processor to add all character widths preceding the first character of the line segment.

The width of each character, is a portion of the total 54 units width of an EM square, as shown in FIG. 2.

Each character occupies a width extending from the left side bearing of the EM square to the end of the character and representing a portion of the total EM square.

For example, the character A shown in FIG. 2 represents 36 of the 54 units of an EM square The point and width size can then easily be determined by multiplying the proportion of the EM square occupied by the character by the point size.

$$\left(\text{Pt. size } X \frac{36}{54}\right)$$

Where the point size is 54 points, 36 points is the width of the character.

When data for the location of the characters are first entered by the composer, the composer sets the raster line level for the base line relative to the height of the character on the page and the X location of the character relative to the width of the page.

Where a string of successive characters is broken by a size change requiring a line of characters to be split into two line segments, the process includes means for adding the widths of all previous characters to determine the X coordinate location for the next line segment starting with the next changed size character.

Once the Header file 103 is complete, with all segments identified, the Set routine is initialized. It is a compare and replace routine as used in the preferred embodiment but can be of any of the suitable routine to reorder all segments relative to the values of reference raster lines.

Referring back to the example of FIG. 17, the identifiable line segments produced by the segmentation routine, FIG. 20, would be "Great Savings" (51) with a Y value corresponding to raster line 1000, the line rule function (52) starting with raster line 1500, the "a" (53) of "at" starting with raster line 1600, the "t" (54) of "at" starting at raster line 1600, the 5 lbs. (55) starting with raster line 2200, the "5" (56) at raster line 3100, the "cans" (57), at raster line 3300 and "Tuna" (58) starting with raster line 2900.

The Set routine FIG. 20 then reorders the RAST address sequence in segment sequence table 107 according to the ascending order of the raster lines.

The process first compares segment number 51 "Great Savings" with segment number 52 the "line rule." Since segment number 52 is a higher Y value, it leaves the order of segment 1 and 2 as originally placed in the file 103.

Next it compares segment 52 with segment 53 the "a" portion of "at".

Since segment number 53 has a higher Y value than segment number 52, it leaves the relative positions of segment 52 and 53 the same in 107.

When the process compares segment 53 with segment 54, the "t" in the word "at", it recognizes that segment 54 has a lower ascending Y value than segment 53 and reverse the order of segments 53 and 54 in file 107 so that segments 53 is proceeded by segment 54.

The process would next compare the Y value of segment 53 with segment 55. As the Y value of segment 55 is higher in ascending value then the Y value of segment 53, the process would leave the segment relative positions unchanged.

Continuing in the order that the information was originally placed in the store by the composer the process would next compare the Y value of segment 55, with the Y value of segment 56. As the Y value for segment 56 is higher in ascending order of the raster lines than the Y value for segment 55, its order in file 107 would be unchanged.

Proceeding then along to the next successive block of information placed into the Header file, the Y value for segment 56 is compared with the Y value for segment 57. As these segments were put into the header file in the proper order of ascending Y value, the order of segment 56 and segment 57 in table 107 would be unchanged.

The next comparison would be between the Y value of segment 57 and the Y value of segment 58. As the Y intercept value of Tuna is 2900 and is a lower ascending value than the Y intercept value 3300 of cans, the order of segment 57 and segment 58 would be reversed, in table 107, segment 58 coming before segment 57.

The process then would next compare the segment 58 with the next preceding segment, which is 56. As the ascending Y value of segment 58 was still lower in ascending order, then 56, 58 and 56 would be reversed in order in table 107.

At this point, the order of these segments shown in Table 107 would be segment 51, 52, 54, 53, 55, 58, 56, 57.

The segmented data would then be loaded into the Data Ram in the new order of segment sequence table 107 order and in a reorder related to the ascending value of the reference raster line Y value for each respective segment. The loading of the line segment data is earlier explained with regard to FIG. 16. The data would be placed in the data ram on a first in first out basis, to be accessible in an order related to the ascending order of the generated raster lines.

This system also solves a further problem occasioned by a further possible arrangement of characters, inputted by the composer as shown by the JA between raster lines 4000 and 4700.

Whereas segmentation is not required for the reasons given above with respect to segments 51 through 57, a situation may arise, when data is loaded into the data ram FIG. 16 and the data ram has insufficient memory space for completely loading all of the "character data". For example the A with point size 40, set between raster lines 4300 and 4700 may not be completely loaded into Data Ram 1. The ODS would be incapable of imaging the complete character. The balance of the data for the A placed in Data Ram 2, would omit the segment header information necessary to form the bottom of the character corresponding to the data for Data Ram 2.

Where a complete segment cannot be placed in a single Data Ram of a desired capacity, that segment data must be inhibited from the first Ram and placed in the second Ram so complete segment data is located in a single Ram.

Where two segments comprise characters on common and noncommon raster lines and the character data for one segment cannot be completely loaded into a single ram as for the "A", then all character data for the common raster lines of the two segments must be inhibited from the first Ram and placed in the second Ram.

The second Ram may be loaded with all of the segmented character data needed for J and the A including all Header information but is instructed to start accessing character data at a data resolution unit (DRU) corresponding to raster line level 4300 corresponding to the next successive raster line following the last data level of Ram 1, as the segment data for the preceding raster lines had already been imaged.

As in the case shown, where a portion of the characters in fully loaded segment (59) the "J" overlaps the characters in a partially loaded segment (60), the "A", it is necessary for the processor to inhibit all data in Data Ram 1 corresponding to those portions of segment 59 as well as 60 imaged on common raster lines and place the information for segments 59 and 60 in Data Ram 2 and in their corresponding sequence.

Of importance to this determination is the location of the bottom of the EM square, of the preceding segments having all their data entered in the Data Ram, in relation to its referenced raster line of the partially loaded segment (60).

As shown above, after a number of line segments are entered into a defined capacity Data Ram, the next line segment to be entered may exceed the available remaining capacity. As a result, a line segment may be incompletely filled in that capacity remaining and a portion of the line segment data will exceed the data Ram limit.

To complete this process, the processor must determine if any segments overlap and are on common raster lines with an incompletely filled segment. Any overlapping preceding segment in the same Data Ram, related to a raster line higher in ascending value than the raster reference line of the last incompletely filled segment must also be loaded into the next successively filled Data Ram. In FIG. 17, the presence of any overlapping preceding segments, such as a preceding segment 59, may be determined by multiplying the reference raster line for any preceding segment by 4/3 to locate the boundary of the extended EM square and its last corresponding raster line having the highest ascending value. In this case, the point size is 30 and 4/3rds times the Point size added to the referenced raster lines for the EM square of preceding segment 59 (4000,) yields 4400. As 4400 is higher in ascending value compared to 4300, the data on raster lines 4300 to 4399, overlapping segment 59 and 60 and imaged on common raster lines must be accessed from the same Ram to permit the part of segment 60 common to segment 59 to be imaged on the common raster lines. The processor inhibits this information in Data Ram 1 for segment 59 and 60, and reloads that segmented information into Data Ram 2.

The processor identifies where the last raster line level on which the data of a preceding overlapping segment was imaged. It identifies the next raster level for imaging the inhibited data in the first defined capacity Data Ram and initiates the accessing of data from the second Data Ram at a data level in Data Resolution Units (DRU's) corresponding to the next raster level imaged on the display following the last data line imaged from Data Ram 1.

In practice all preceding segments loaded into the Data Ram are examined for a coincidence of the last related raster line of each preceding segment with the reference raster line level of an incompletely filled segment.

The Header file 103 includes all necessary header data for each segment the data including its address on the disk. Additionally, the header file size includes font, display location, set width, slant, and flash status.

The upper left hand corner is of the EM square of the font character in each segment is used to identify the location of each segment in the direction of the raster line progression. Each segment is built of successive characters, all with EM squares having the same location relative to the order of the raster lines.

Where the next successive character in the text inputted data is on a different base line, or has a different size, the raster lines passing through the upper left hand corner of that next successive characters EM square will be a different value.

This device references the first character of each identified segment to a referenced raster line. All successive characters having the same base line and the same size, are referenced to the same raster line and form a segment.

A segment is ended, as explained where a character of a changed size or a character on a new base line appears in the sequence of input data, or a line rule or a reverse video function appears which requires a new respective X and Y location or a sector overflow occurs. The next segment then is built upon the next first character.

In summary, it can be seen that input character data which is in a sequence as it is being composed, and may follow the writing convention of left to right and from the top of the page to the bottom of the page.

Any character generating system imaging characters on successive raster lines may need to image characters in an order different from the composition order or any other sequence order.

Where characters are entered from left to right and the characters exclusively are on common raster lines then all characters in that sequence can be imaged on successive raster lines of ascending value, the data for each successive character being accesed at the same time as the data for the first character.

However, in other cases where the characters successively entered by the composer are on noncommon raster lines and common raster lines and where the characters successively insequence, are imaged on noncommon raster lines having a lower ascending value but generated in sequence before the common raster lines, then the access of character data in that sequenced order will result in the loss of a portion of the characters having noncommon raster lines of the lower ascending value.

The principles of this invention are applicable especially where a raster line pattern is arranged across a print medium, in one direction, with the initial raster lines being numbered 1 the last and being No. N and with the raster lines increasing in number in the direction of generated raster lines and where raster line are swept from the left side of the page to the right side of the page, and wherein one character is located to the left of a second character with a portion of the second character intersecting a common raster line with the first character and intersecting noncommon lines having a lower ascending value than the common raster lines.

In the ordinary system which identifies input data for output to a character generating system by the location of the data closest to the left side of the print medium, then in the example above, the first character data will be identified and outputted on a real time basis prior to the identification of the second character data. In such a system, the first character will be identified at the occurrence of a raster line, having a value consistent with the occurrence of that character. That characteristic may be a coordinate value such as a reference raster line or Y value for the upper left hand corner of the EM square or may be the first occurrence of an intersection of the first character with a raster line or any other suitable characteristic.

As the raster lines are being generated on a display in a single direction, on a real time basis, the generation of the character data must be of the same timing as the generation of the raster lines for each piece of data.

Segmenting identifies successive characters related to a set of raster lines. The character data after segmenting is referenced to the raster line order. The referencing is accomplished by identifying a raster line that intersects a designated parameter of each respective segment.

In the case of the preferred embodiment that designated parameter is the upper level of the EM square for the first segment character. However, within the spirit of the invention, it is not necessary that this portion of the EM square be used as other parameters of the character can be used such as the height of each referenced to the ascending order of the raster lines. However, for convenience and for practical reasons, the system will run efficiently where the aforesaid segment EM square parameter is used resulting in the longest possible segment length.

It can be seen then that prior to this system, the identity, size and location of character data may be placed in sequence into character generating device such as the typesetter.

However, where the provision of this data in its input sequence, would prevent imaging of portions of the characters this system reorders the data into segments, and in an order related to the order of the raster lines generated on the display, so that the input data is provided to the ODS for generating the character information, in sequence with the generation of the raster lines.

In the preferred embodiment, character data in the Data Ram is accessed in the order it is placed in the Data Ram.

The input character data must be reordered so it is placed in the Data Ram in the correct relation to the raster line order.

The principles of the invention may be applied to any variation of the preferred embodiment where the character is entered randomly in the address Data Ram and the addressing sequence for accessing data from the Data Ram is reordered in the correct relation to the raster line order.

For example, a means for addressing the Data Ram (not shown) may be added to the preferred embodiment. The segmented character data may be loaded into the Data Ram in any sequence. The set routine for reordering the segments to the raster line order and by ascending reference raster line values may be accomplished after the step of Data Ram loading by rearranging the Data Ram addressing sequence to the ascending reference raster line order of each segment.

It should be noted that this method rearranges data from any prearranged sequence to a reordered sequence related to the raster line order. Where character data is accessed exclusively from store according to a raster line sequence and according to an arranged data sequence, the principles of this invention may be applied to reorder the character data so it may be accessed in its reordered sequence exclusively in relation to the raster line order only and independently of any other data sequence.

This invention is a system which stores normalized encoded fonts, computes the intersection points of raster lines intersecting a plurality of displayed characters, of varied size and base lines, and with line rule and reverse video function as well as sector overflows in the stored data, regardless of the stored sequence of that data, and controls the imaging of those display characters responsive to the computed intersection points.

It accomplishes this result by segmenting strings of successive character data and reordering those segments exclusively in relation to the raster line order so the data may be used to generate the intersection points in an order relation to the raster line order.

We claim:

1. A method of rearranging the order of random size characters from an input sequence of characters to a raster line order of characters, for display on respective raster lines of a raster display, said characters represented by character data arranged in an input sequence, said raster lines generated in a raster line order, 1 to N, and with said input sequence of characters being different from the order of said characters in the said respective raster lines for at least a plurality of characters in said input sequence, comprising the steps of:

(a) arranging in an input sequence, character data in a first store representing the identity, size, and display location of the characters to be formed on said raster display, (b) examining the character data in said input sequence for a change in size and display location, from one character to a successive character, (c) identifying segments of character data for successive characters in said input sequence, having a common display location and size, said segments being in said input sequence, (d) said step of identifying segments including the step of identifying reference raster lines, within said raster line order 1 to N, related to a parameter of at least one character within respective segments, and recording said reference raster lines, (e) rearranging the order of said segments according to the value of the reference raster lines for the respective segments and related to the said order of raster lines.

2. The method of claim 1 where said random size characters are defined within respective EM squares, with each said EM square being a reference size square for characters of the same size and with said parameter being a location within said EM square and where step (d) includes the step of combining a value for said parameter with a value for said display location to identify said reference raster line.

3. The method of claim 2 where said EM squares each have upper and lower levels, said display location including a character base line location and said EM square lower level being referenced to the said base line, said parameter being the upper level, and said reference raster line being related to said upper level.

4. The method of claim 1 where said parameter has a value related to the character size on the display and including the step of combining said parameter value with a value for said display location to identify the reference raster level.

5. The method of claim 1 including the step of accessing said data segments according to said rearranged order and related to the order of said generated series of raster lines.

6. The method of claim 5 including the step of storing and accessing normalized and encoded front data for said characters represented by said accessed segments, and the step of deriving the locations of the boundaries of the displayed characters with respective raster lines from said normalized encoded character data and said accessed segment data.

7. The method of claim 1, where the order of said raster lines is an ascending order 1 to N in a first direction and which each raster line being generated in a second direction, said input sequence of character data includes at least first and second characters having display locations on common raster lines and where said second character has a display location displaced from the first character in the second direction and on raster lines having a lower ascending value than said common raster lines, said second character data segment being successive to said first character data segment in said first order, and said step (e) includes the step of rearranging the order of said first and second character data segments to place the first character data segment successive to said second character data segment in said rearranged order.

8. The method of claim 7 including the steps of accessing stored normalized encoded font character data and said data segments in said rearranged order, for said first and second characters and, deriving the location of the boundaries of the display characters with respective raster lines from said normalized encoded character data and said reordered character data.

9. The method of claim 1 where said parameter is indicative of size.

10. The method of claim 1 where said step (d) of identifying segments and recording said reference raster lines includes the step of building a header file comprising the addresses of character data in the said first store, for respective segments, for identifying the beginning of said respective segments, and the display locations of the segments in the two-coordinate system, and where one of the coordinates is the reference raster line for the respective segments, and said step e of rearranging includes the step of reordering the sequence of said header file information in said header file according to the value of the segment's respective reference raster lines.

11. The method of claim 10 where said step (e) of rearranging the sequence of said header file information includes the step of reordering according to the ascending value of the segments' respective reference raster lines.

12. A method of rearranging the order of random size characters, from an input sequence of characters to a raster line order of characters, for display on respective raster lines of a raster display, said characters represented by character data arranged in a first store, said display being a series of raster lines generated in a raster line order, 1 to N, and with said input sequence being different from the order of said characters on said respective raster lines for at least a plurality of characters, comprising the steps of, (a) arranging in said first storage, and in an input sequence, character data representing the identity, size and display location of the characters to be formed on said raster display,
(b) examining the character data in said input sequence for a change in size from one character to a successive character,
(c) identifying segments of character data for successive characters in said input sequence, having a common size,
(d) identifying reference raster lines within said raster line order 1 to N related to a parameter of at least one character within respective segments,
(e) storing said reference raster lines for said respective segments of character data in said input sequence,
(f) rearranging the order of said segments according to the value of the segments' respective raster lines within said raster line order.

13. The method of claim 12 where said step (b) of examining the character data includes the step of examining successive characters for a line rule function or a reverse video function or a sector overflow or a change in display location, and said step of identifying segments includes the step of identifying the occurrence of a change in size or a line rule function or a reverse video function or a sector overflow or a display location change as the end of a first segment and the start of a second segment.

14. The method of claim 12 wherein said step (e) includes the step of storing the display locations for said respective identified segments.

15. A method of claim 14 where said step of storing the display locations includes the step of building a header file, including the said display locations of the segments in a two-coordinate system, with one of the coordinates being the said reference raster lines for the respective segments and wherein the step (f) of rearranging includes the step of reordering the sequence of header information in said header file according to the value 1 to N of the segments reference raster lines.

16. The method of claim 15, including the step of accessing said segments according to the said rearranged order and related to the order of said generated series of raster lines and a step of deriving the locations of boundaries of the displayed characters with respective display raster lines from a second store of normalized encoded character data and said accessed segment data.

17. The method of claim 12 wherein said step of storing includes the step of storing the addresses of character data in the first store, for identifying the beginning of the respective segments for said characters, represented by said character data.

18. The method of claim 17 including the steps of accessing said data segments according to said rearranged order and related to the order of said generated series of raster lines, storing and accessing normalized encoded font character data for said characters represented by accessed segments and deriving the locations of boundaries of displayed characters with respective raster lines from said normalized encoded data and said accessed segment data, and where said step of identifying the boundaries includes the step of loading the reordered segment data into a first random access memory (first RAM) having a defined capacity, sensing when at least a part of a first segment cannot be loaded into said first RAM, examining a preceding segment loaded into said first RAM for at least one common raster line overlapped by the characters represented by the said first segment and said preceding segment, inhibiting the accessing of data on the first segment and said preceding segment for said common raster line from said first RAM and loading the inhibited segment data for said preceding segment and for the first segment into a second random access memory (second RAM) of defined capacity.

19. The method of claim 18 where said normalized encoded character data is encoded in a two dimensional coordinate system and said step of inhibiting includes the step of identifying a data level within said normalized encoded character data corresponding to one of said two coordinates and related to a common overlapping display raster line level, and said step of identifying the said boundaries includes the step of accessing data from said second RAM starting at a data level corresponding to said common overlapping raster level.

20. The method of claim 19 where said step of inhibiting includes the step of inhibiting access of data for the first data level related to the first common overlapping raster line level and for all successive raster line levels in said first RAM.

21. The method of claim 18 where said step of loading said segment data includes the step of loading the segments' reference raster lines.

22. The method of claim 18 where said step of examining the preceding segment for a common raster line includes the step of sensing the last raster line having the highest ascending order for the characters of the preceding segment and sensing the first raster level having the lowest ascending order related to the said first segment and comparing the said raster line values.

23. The method of claim 22 where said random sized characters are defined with respect to EM squares with each said EM square being a reference sized square for characters of the same size and with said EM square having an upper level and a lower level, said lower level being referenced to a display location on said raster display and where said last raster line is related to the lower level of the EM square for the said preceding segment.

* * * * *